United States Patent [19]

Prewitt

[11] 4,059,247
[45] Nov. 22, 1977

[54] CONVERTIBLADE

[76] Inventor: Richard H. Prewitt, R.R. No. 3. 3585 Paris Pike, Lexington, Ky. 40511

[21] Appl. No.: 723,661

[22] Filed: Sept. 15, 1976

[51] Int. Cl.² .................. B64C 27/02; B64C 27/26
[52] U.S. Cl. .................................. 244/7 R; 244/8; 244/17.11; 244/102 R; 244/83 H
[58] Field of Search .............. 244/6, 7 R, 7 A, 8, 244/17.11, 17.13, 17.25, 17.27, 52, 138 A, 141, 80, 93, 38, 83 F, 83 G, 83 H, 83 J; 416/140–142; D12/73, 78, 79

[56] References Cited

U.S. PATENT DOCUMENTS

| 1,327,055 | 1/1920 | Macy | 244/80 |
|---|---|---|---|
| 1,892,006 | 12/1932 | Roberts | 244/80 |
| 1,989,291 | 1/1935 | Prewitt | 244/38 |
| 2,380,581 | 7/1945 | Prewitt | 244/17.13 |
| 2,395,809 | 3/1946 | Goddard | 244/52 |
| 2,484,739 | 10/1949 | Remmen | 416/140 A |
| 2,665,082 | 1/1954 | Anderson | 244/52 |
| 2,757,886 | 8/1956 | Correa | 244/38 |
| 2,990,149 | 6/1961 | Samms | 416/142 |
| 3,246,862 | 4/1966 | Celniker | 244/7 R |
| 3,404,852 | 10/1968 | Sambell et al. | 244/7 A |
| 3,460,628 | 8/1969 | Tankersley | 416/141 |
| D. 203,722 | 2/1966 | Prewitt | D12/73 |

FOREIGN PATENT DOCUMENTS

| 829,540 | 6/1938 | France | 244/138 A |
|---|---|---|---|
| 1,003,057 | 9/1965 | United Kingdom | 244/7 R |

Primary Examiner—Galen L. Barefoot
Attorney, Agent, or Firm—Frank C. Leach, Jr.

[57] ABSTRACT

An aircraft which operates between the surface and the air as a rotating wing aircraft (helicopter-autogiro). When airborne a rotor pylon latch is released and the pilot flies the rotor system aft about its pivot to the fuselage to form the tail of a high speed jet propelled airplane. Altering the pitch angle of the blades controls the aircraft, called a convertiblade, for helicopter-autogiro and airplane configurations and for moving the rotor between its configurations. The rotor is revved up with rocket fuel piped to burner jet nozzles located at the blade tips. A jump-take-off may be used to efficiently get the convertiblade airborne at a good climbing speed. Prior to landing, the rotor blades are released from their operation as roll control surfaces for the airplane configuration; then, they are permitted to rev-up and act as a brake to reduce the speed of the airplane. At a suitable speed, the pylon is released from the fuselage and the rotor system is flown by the pilot's controls up into autogiro configuration where it automatically latches permitting the pilot to make a flared autogiro landing. The transition between autogiro and airplane takes place in a very short period of time. The fuselage is kept stable during the transitions by the pilot's controls and by establishing lateral, directional, and longitudinal stability through relationships between the center of gravity and the center of all fin-areas of the aircraft for each regime of flight. Several methods of augmenting the rotor controls during transition are presented including the use of combined wing tip elevators and ailerons.

22 Claims, 44 Drawing Figures

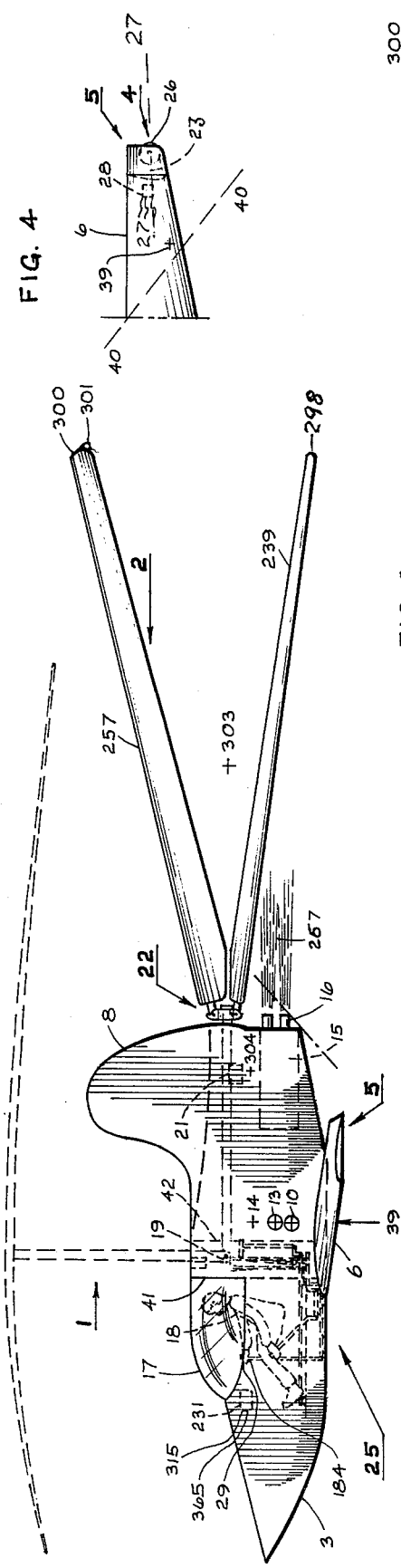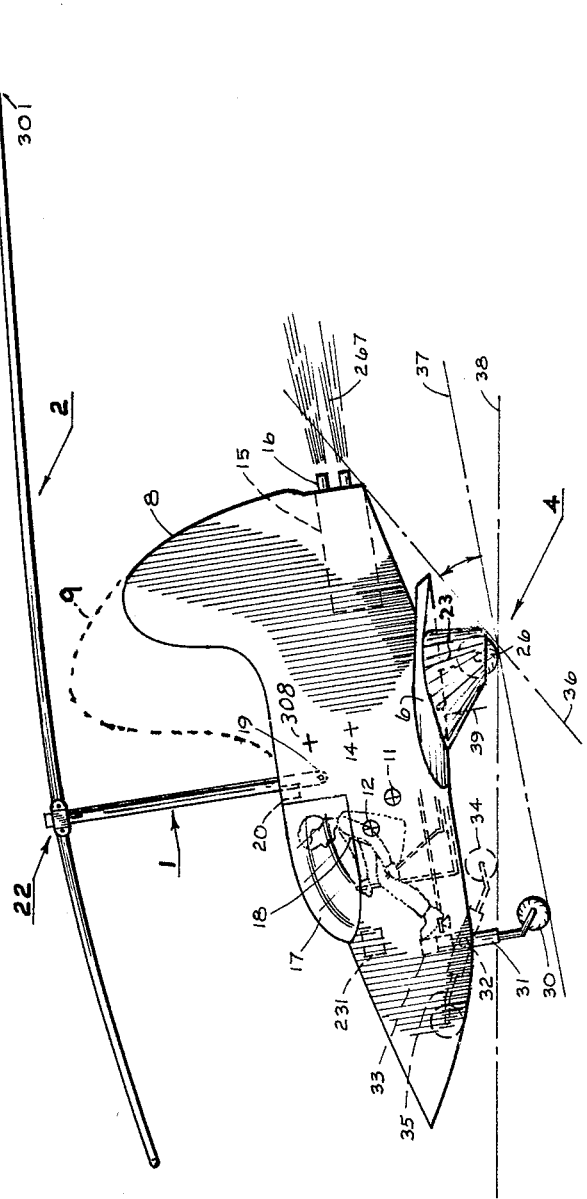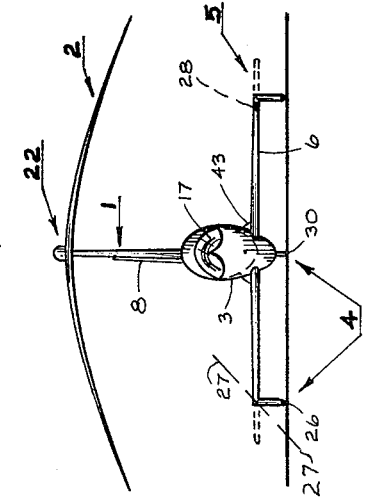
FIG. 1
FIG. 2
FIG. 3
FIG. 4

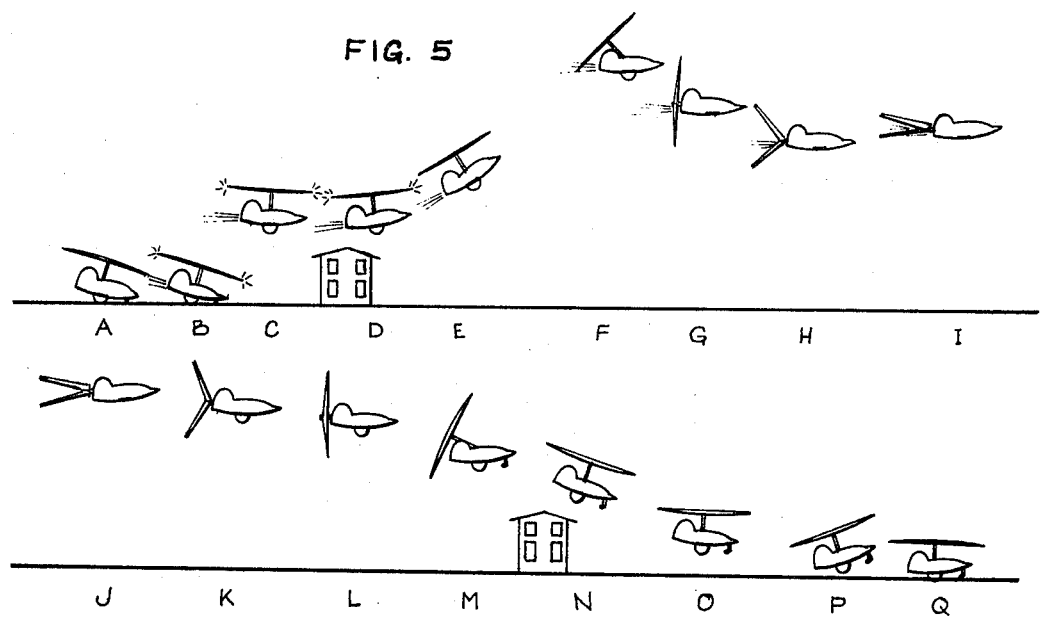
FIG. 5
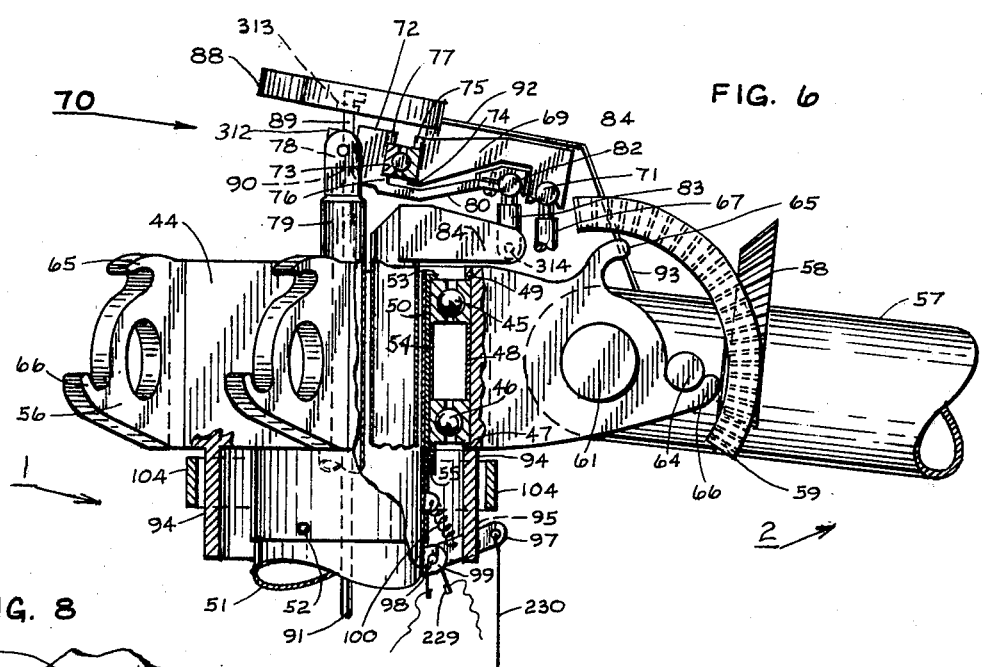
FIG. 6
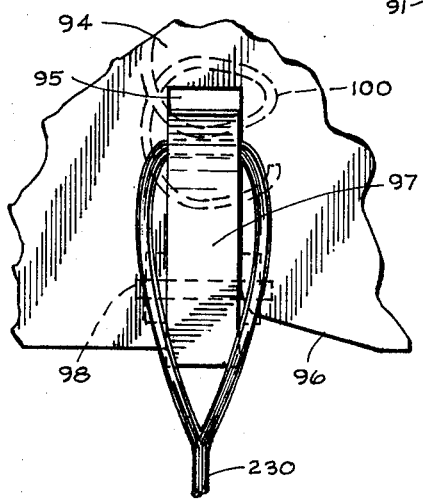
FIG. 8
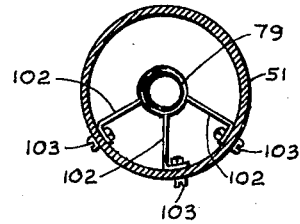
FIG. 9
FIG. 10

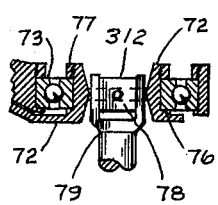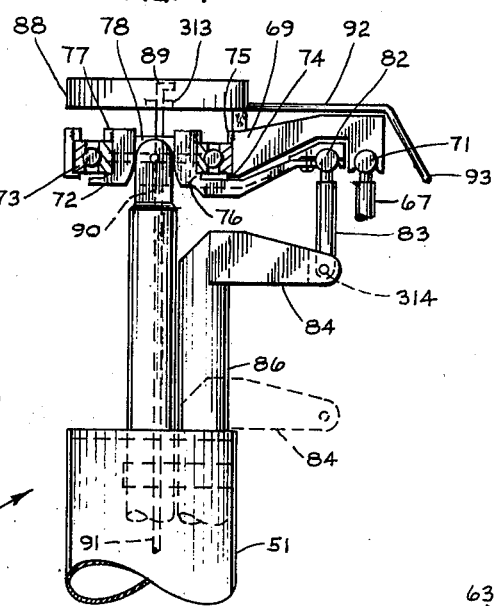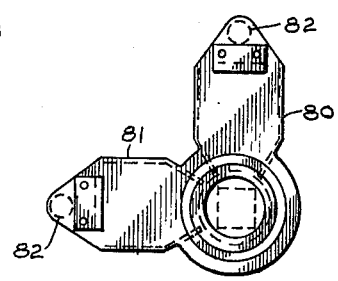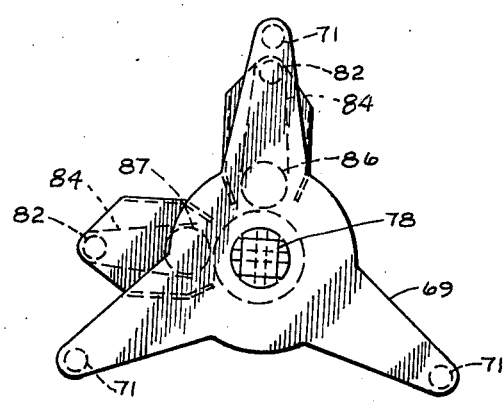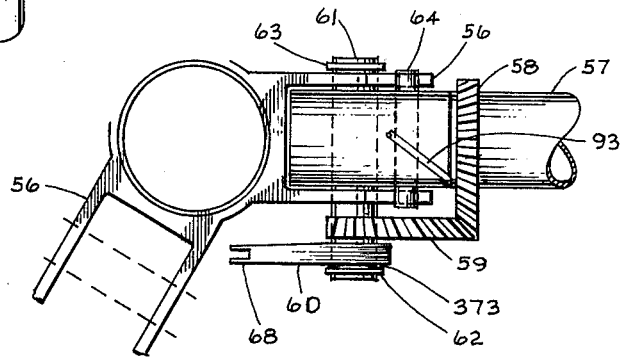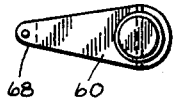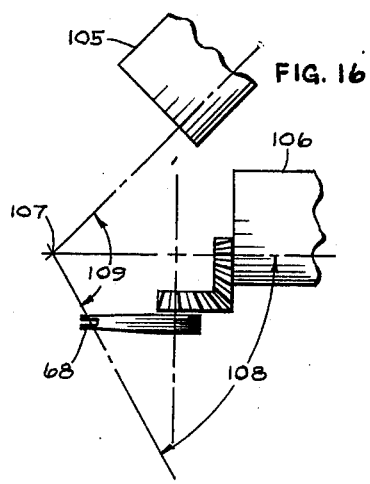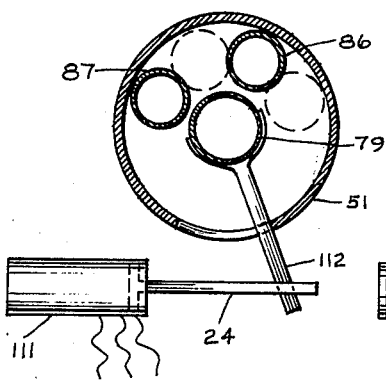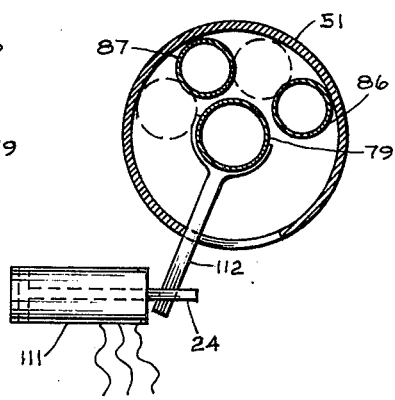

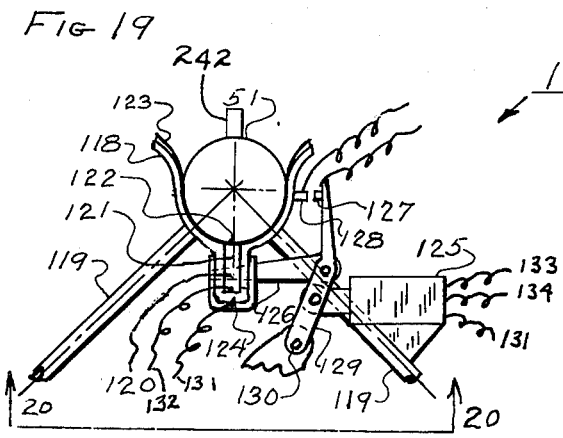
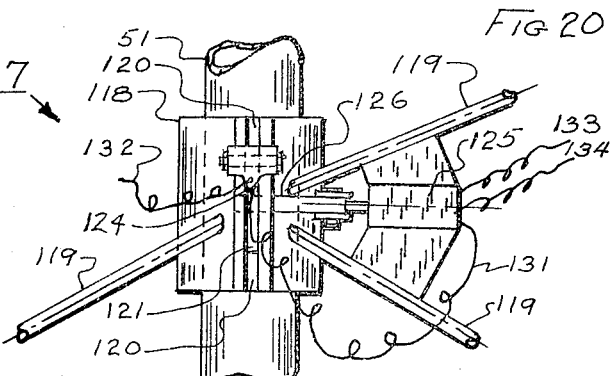
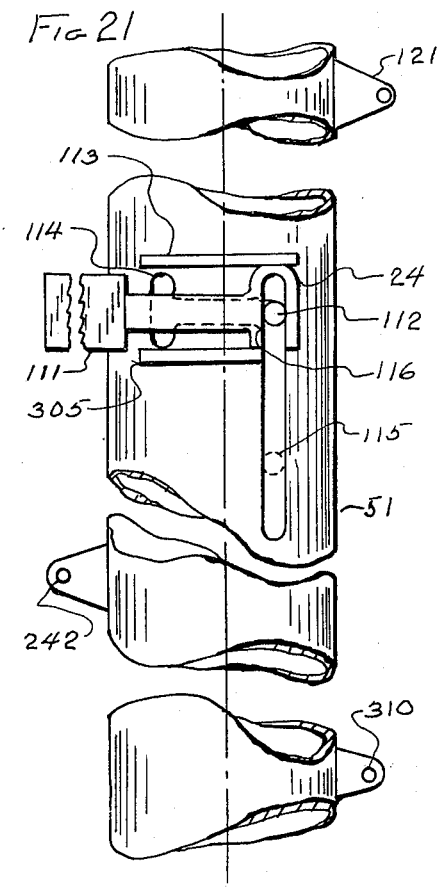
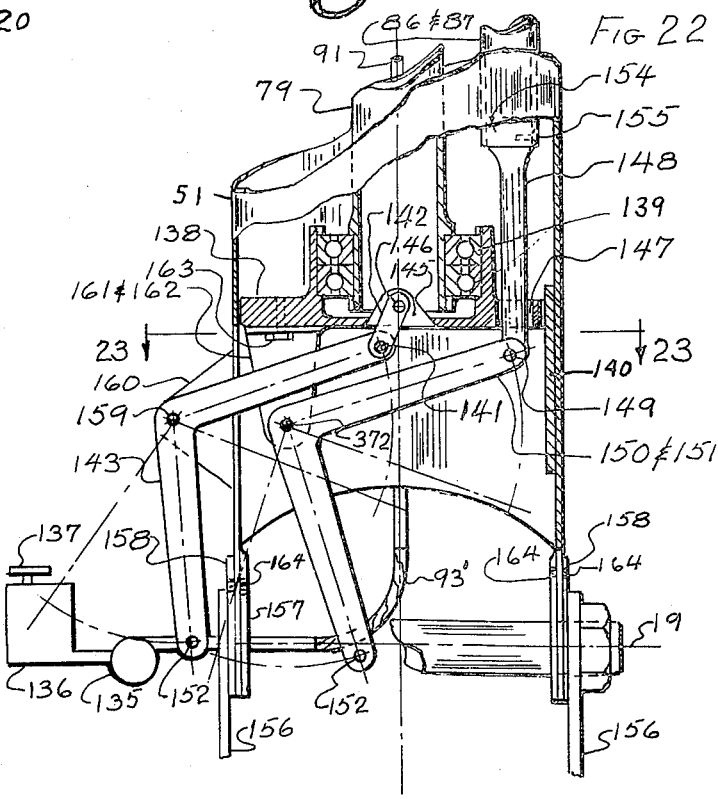
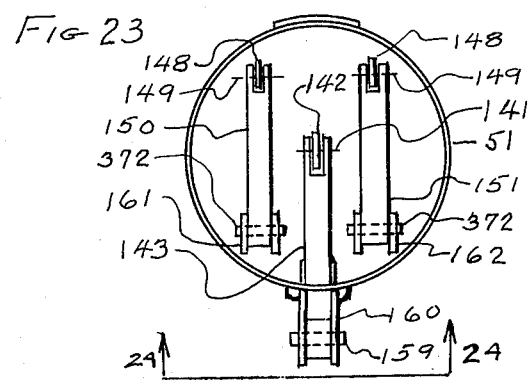
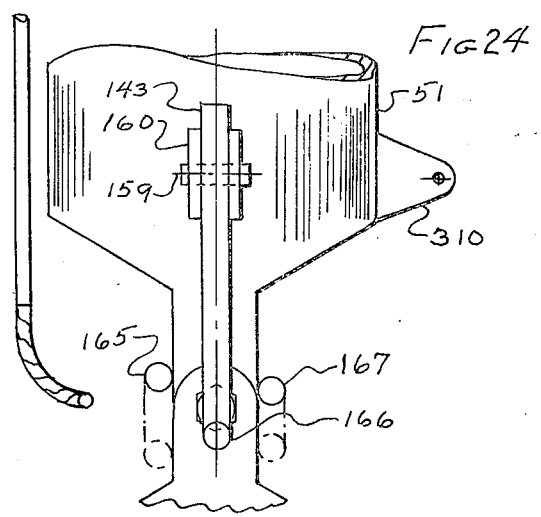

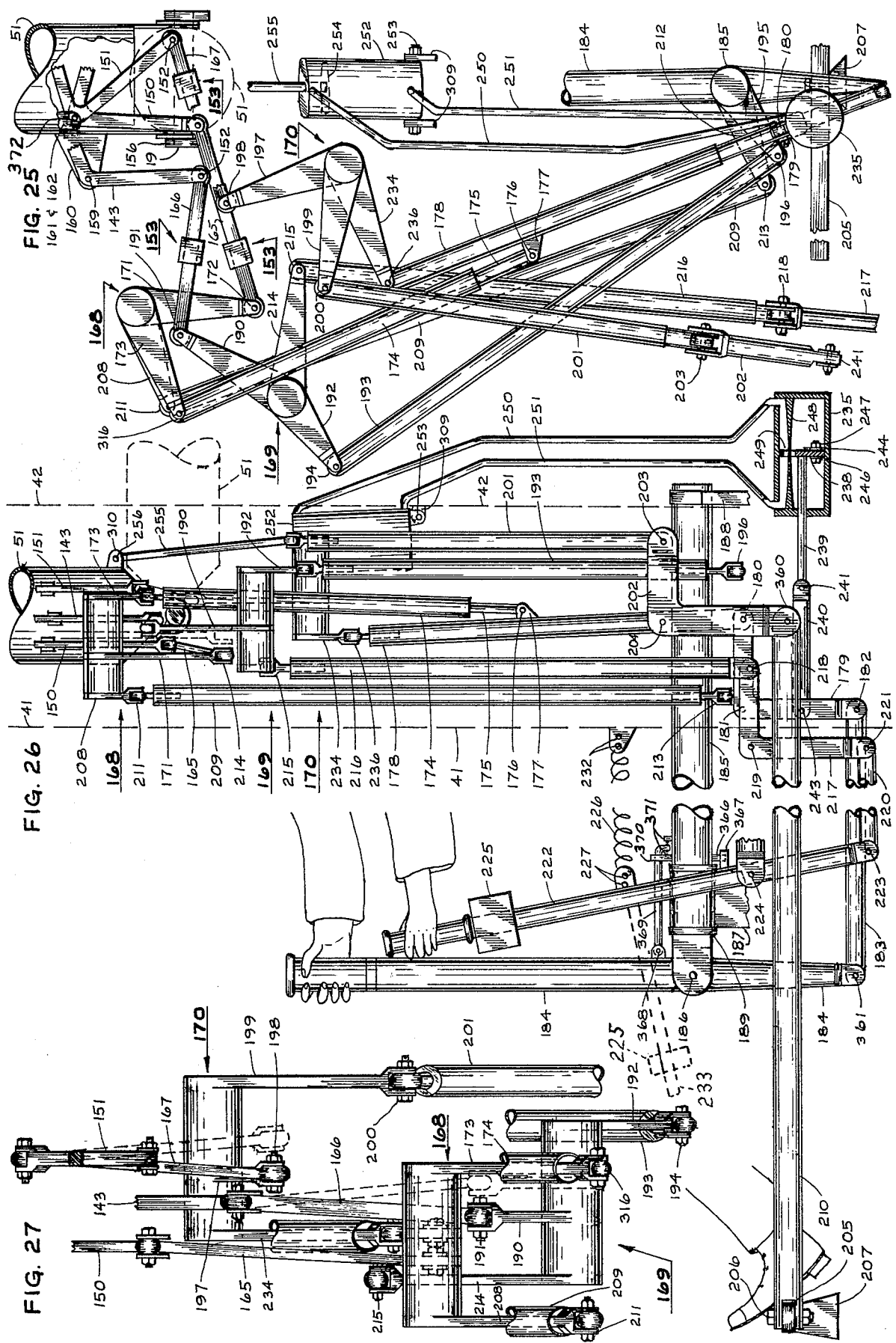

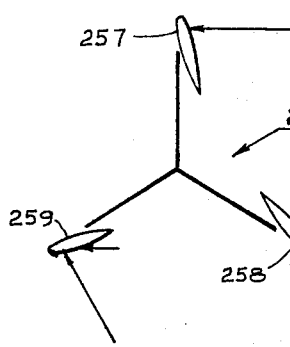
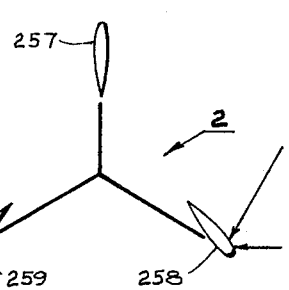
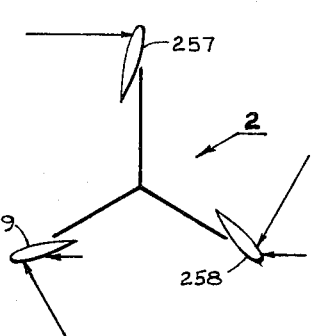
FIG. 28  FIG. 29  FIG. 30
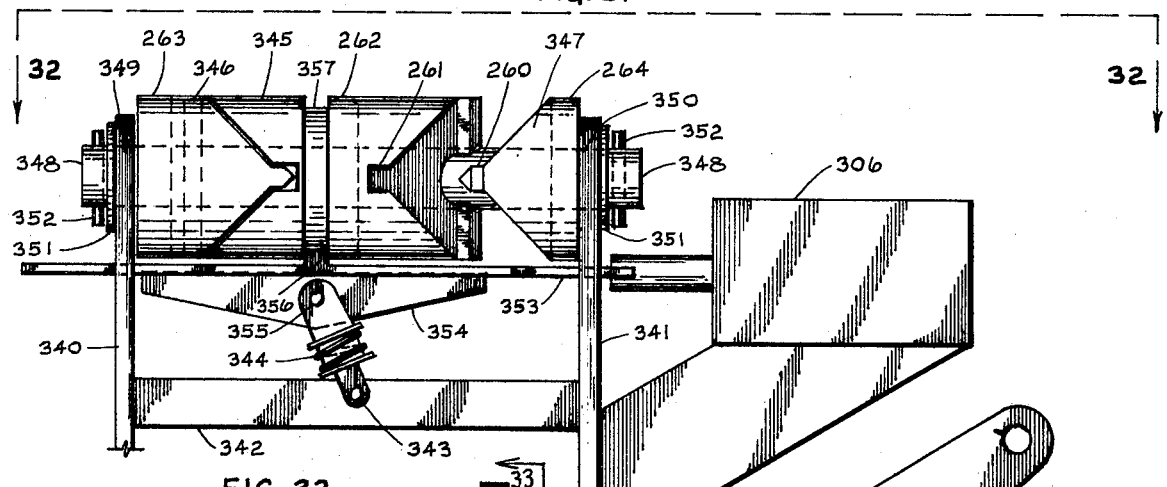
FIG. 31
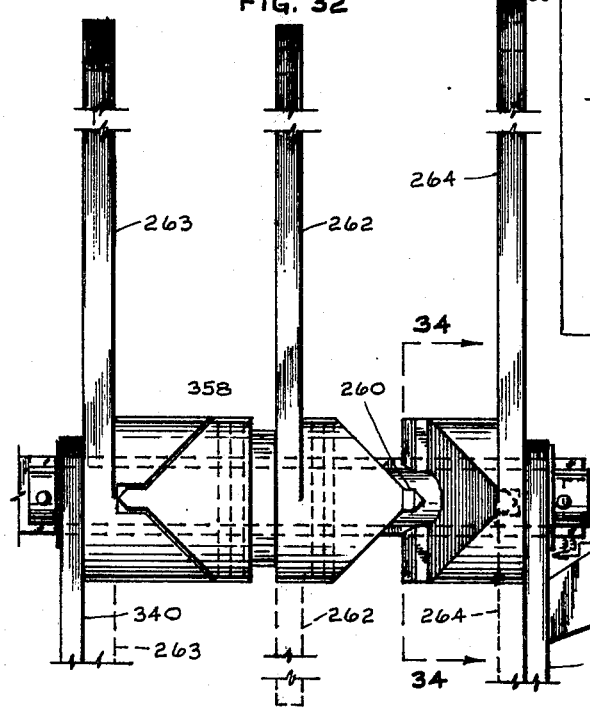
FIG. 32
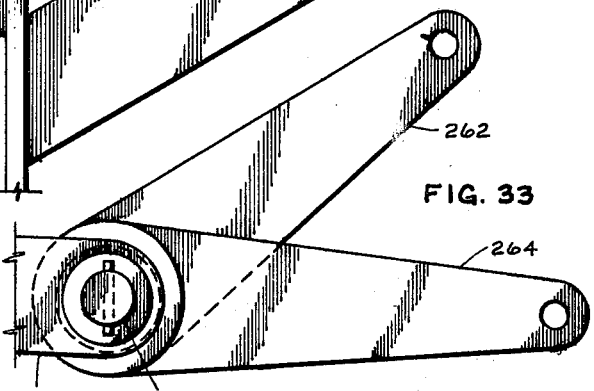
FIG. 33
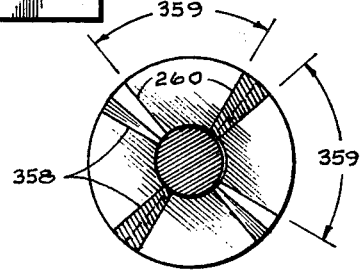
FIG. 34

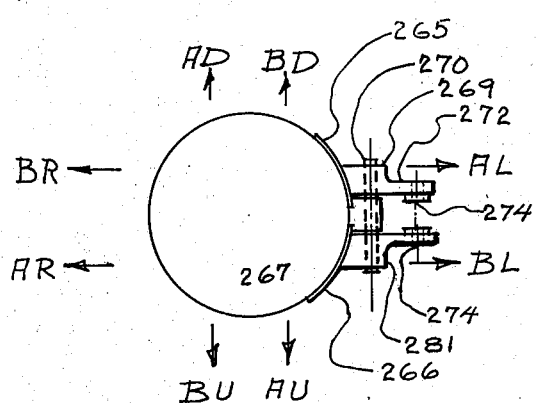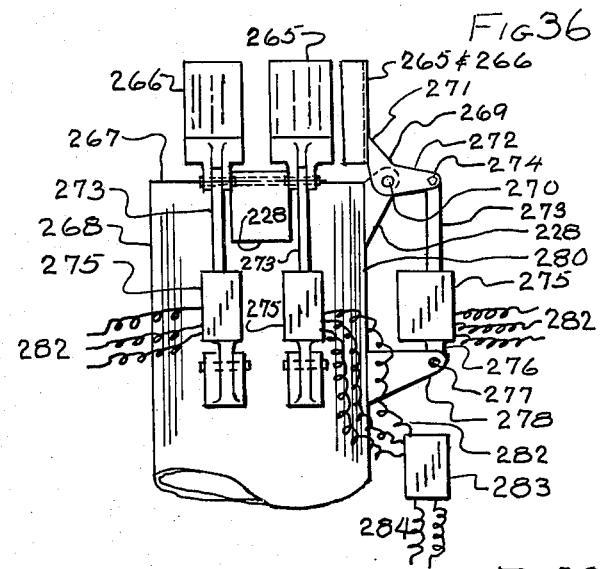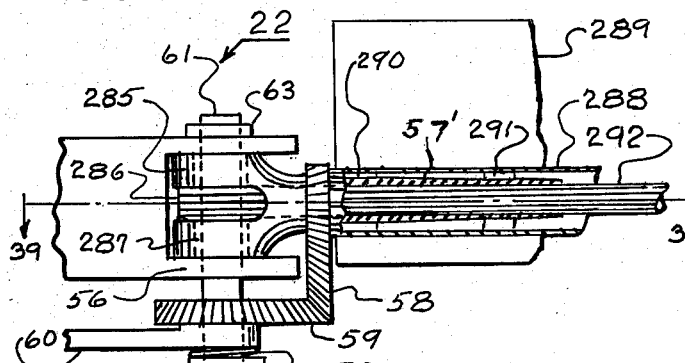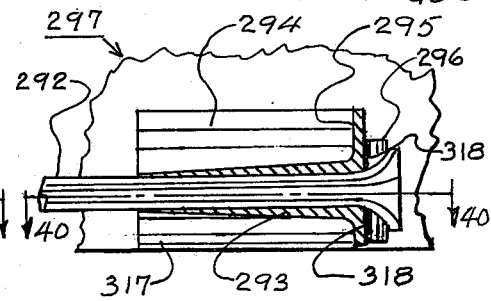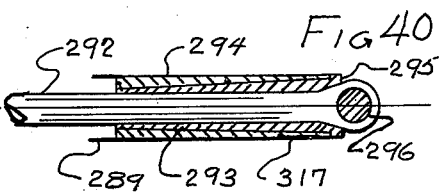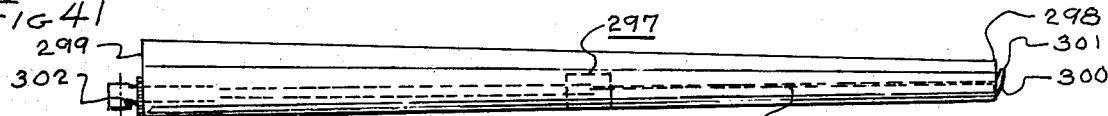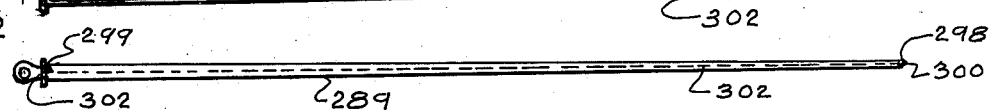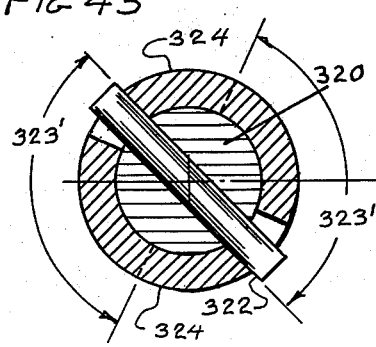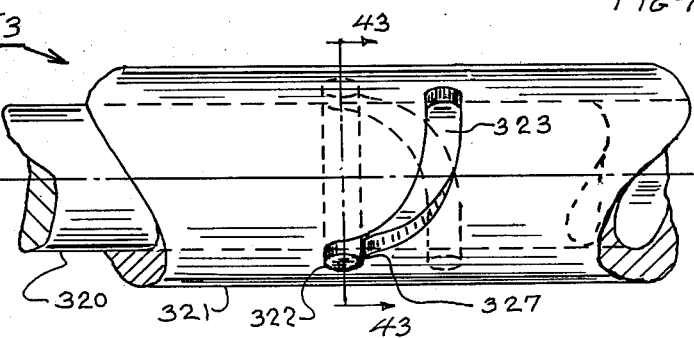

CONVERTIBLADE

REFERENCES

U.S. Patents:

In one form of my invention, it is proposed to use controlled wing tips containing the landing gear wheels. The wing tips are pivoted at approximately 45° as taught in my U.S. Pat. 1,989,291 issued Jan. 29, 1935.

The jump-take-off features of this invention has been described in my U.S. Pat. No. 2,380,581 issued July 31, 1945.

U.S. Pat. No. De. 203,722 issued Feb. 8, 1966, shows the outlines of a convertiblade type aircraft.

These and other U.S. Patents issued to me illustrate and describe designs of autogiros, helicopters, and rotor blades which are knowledgeable to this applicant and to anyone else skilled in the art. It is intended that these U.S Patents and published papers written by this applicant will be evidence that this application includes the knowledge of the art as contained in these prior papers and inventions.

SUMMARY OF INVENTION

The purpose of this invention is to provide a vertical take-off and landing (VTOL) aircraft which can fly long distances at high speed or carry greater payloads at high speed than current VTOL airplanes or helicopters.

A jet propelled helicopter rotor is used during inital stages of take-off, then an autogiro type rotor is used to climb and accelerate the aircraft to its maximum speeds. The rotor system is then quickly flown from its erected position to a trailing position. In the trailing position, the blades are stopped, and the pylon is latched to the fuselage. Thereafter the assembly is used to form a tail to stabilize and control the airplane configuration. In reverse order, the rotor is unlatched from the fuselage and flown to its upright autogiro position where the pylon is latched to the upper part of the fuelage. In this configuration, the aircraft is landed in a small area using a flared approach and "touchdown". I call this new form of aircraft a "convertiblade" because the controlled blades convert between a lifting rotor machine and a non-rotating tail for stabilizing and controlling a high speed aircraft. Other types of controls including ailerons, elevators, direction changes of engine thrust, or attitude control rockets can be used to control the aircraft during the transition, but it is probable that changing blade pitch will suffice and be preferable. This is likely because the operation is completed in about 3 seconds. The centers of gravity of the aircraft in relation to the centers of fin-areas may be stable for both configurations.

The ratio of lift to drag of an airplane wing is twice that of a helicopter or autogiro rotor. In addition, the pylon that supports the rotor adds additional drag. When the pylon and blades are folded back, the major portion of their drag is eliminated. Because the blades are positioned at a large sweep back angle, their effective thickness ratio is reduced to thickness ratios that give very low values of drag. These characteristics indicate the relatively high efficiency of the convertiblade relative to the efficiency of helicopters or autogiros.

Experience has shown that the most efficient method of accomplishing vertical take-off and landing is by rotating wing aircraft. This is so because the amount of power required is reduced when the aircraft lift system is acting on a relatively large quantity of air. The larger quantity of air is accelerated downward at a lower velocity requiring less energy. The energy required is the product of the downward velocity of the air and the lift.

It is known that very high speeds are accomplished with low frontal area and relatively small wing area all properly streamlined. The convertiblade accomplishes this.

The rotor is accelerated up to speed and additional power is provided for sustained jump-take-off by burning catalyzed hydrogen-peroxide ($H_2O_2$) or similar rocket fuel at the blade tip jet engines where the expanded gas is ejected. The entire weight of this installation with sufficient fuel for 8 take-offs is about 2% of the gross weight of the convertiblade. The additional weight added for the controls and pylon pivoting is calculated to be about 1% of the gross weight. These additional items that are required to convert a helicopter to a convertiblade, including wings, amount to about 5% of the gross weight. The weight of the helicopter drive system and torque correction system is 15% of the gross weight. Thus, the convertiblade will have a weight advantage over a helicopter of (15−7) = 8% of the gross weight to be used for greater power, fuel, or payload. The convertiblade can operate at supersonic speeds or it will cruise at $700^{1/}$sec. at S.L. or $850^{1/}$sec. at altitude. The subsonic speeds can be obtained with moderate engine thrust relative to gross weight. There will be sufficient fuel for long distance flights or the convertiblade can carry greater payloads.

EXPLANATIONS OF CONFIGURATIONS SHOWN IN FIG. 5:

(The letters below correspond with the letters shown on FIG. 5.)

A. The convertiblade is in the autogiro configuration resting on the ground with drooped non-rotating blades.

B. The machine is on the ground in the autogiro configuration with engine thrust. It is tilted forward and rests on the wing tip wheels and forward landing gear wheel. This puts the convertiblade in position for a jump forward when the fueled blade tip burners have accelerated the rotor to about 1.5× normal rotor speed. The jump forward helps to get the convertiblade up to a good climbing speed for the autogiro mode of flight.

C. Top of the jump which is sufficient to clear trees and normal houses.

D. Horizontal speed in the partial autogiro mode is gained between positions "C" and "D". The rotor tip jet power may continue to be used in between positions "C" and "D" if needed to maintain altitude.

E. The aircraft is now climbing in the pure autogiro mode. The engine thrust is approximately half the gross weight.

F. At a suitable altitude and at a horizontal speed of approximately 150 knots, the pylon is unlatched, and the rotor system is flown back so that the pylon is horizontal as illustrated in "G".

G. The movement of the rotor between positions shown in "E" and "G" is carried out at substantially zero thrust; therefore, it has substantial kinetic energy when in position "G". A part of this kinetic energy is expended in increasing the forward speed of the convertiblade prior to altering the collective pitch to cause the blades to take the trail position shown in "H". At G and H, the blade pitch is reducing faster than the induced angle to produce forward thrust.

H. An intermediate position while converting the blades from the autogiro to the airplane configuration. Here the blade pitch is rapidly approaching −90°.

I. The high speed airplane configuration where changing blade pitch controls the attitude, direction, and roll of the airplane. Blade pitch −90° ± 10% for control.

J. High speed airplane configuration preparing for a landing. Horizontal speed 150 to 450 knots.

K. The rotational lock on the rotor is released and suitable blade pitch control is applied to cause the rotor to turn and start decelerating the aircraft. A suitable means based on a spring and weight to control collective pitch will be used to limit the deceleration of the aircraft.

L. The convertiblade has decelerated and the rotor has accelerated up to about 50% over normal speed in the configuration shown at "L" to provide excess kinetic energy for landing.

M. The rotor is controlled from the position shown at "L" to that shown of "N" in approximately 3 seconds. The position shown at "M" is intermediate.

N. Autogiro glide in preparation for a landing.

O. Starting a flare for the landing. In confined areas, the blade tip jets may be activated to make a helicopter type landing.

P. The convertiblade, in autogiro mode, is flared to increase lift and kill forward speed.

Q. Between the flare landing shown in "P" and its resting position shown in "Q", the excess kinetic energy in the rotor is used by applying collective pitch to permit a soft landing. Rotor is then stopped.

The following dissertation covers a generalization of the operating stages outlined in FIG. 5 and the comments relative to positions A-Q inclusive.

A jump-take-off usually involves revving-up the rotor to greater than normal speed with blades set at zero angles of attack. Lift is then suddenly increased by increasing the pitch of the blades to efficient lifting angles of attack. The blades are maintained at these angles throughout the jump-take-off.

The power connection to the rotor had to be disconnected before the autogiro left the ground to prevent the machine from rotating while airbourne. The convertiblade is powered by the blade tip jets and therefore the power can be used when the ship is airbourne. (To this extent, the convertiblade is a helicopter). It is planned to continue applying the blade tip jet power until the convertiblade is at a good forward speed for climb. Thus, in the early stages of the take-off there are three sources of power applied to the autogiro. They are: the engine thrust; the blade tip jets; and the excess kinetic energy stored in the rotor when it is revved-up to greater than normal speeds. Take-off to tree tops will be at 30° to 45° to the surface in calm air--steeper into the wind.

During a jump-take-off, the rotor lifts more than the weight of the autogiro. Initially, the lift may be twice that of the weight of the autogiro. On the other hand, the engine thrust may be only a fraction of the weight of the autogiro.

The power derived from the blade tip jets may be sufficient to cause the convertiblade to hover out of ground effect. On the assumption that the latter is so, the entire value of the excess kinetic energy of the rotor and the horizontal vector of the engine thrust may be conservatively used to lift and accelerate the convertiblades forward speed. The induced power requirements are reduced with increasing speed and the engine power available increases with increasing speed; therefore, it is very important to increase the forward speed as fast as possible.

The rotor thrust has by far the greatest influence. It is slanted forward from the beginning until the desired speed has been reached.

In the attitude illustrated in FIG. 2, approximately one-fourth of the rotor thrust is directed forward. If the initial rotor thrust is twice the weight of the convertiblade, then the forward thrust from the rotor will be half the weight of the machine. If the initial engine thrust, with after burners, is half the weight of the convertiblade, the total forwardly directed thrust will be equivalent to the weight of the convertiblade, and it will be accelerated forward at over 30 feet per second. If this is maintained for 2 seconds, the forward speed will be sufficient for the engine to maintain altitude without further assist from the blade tip jets, and the convertiblade may proceed to climb or increase its horizontal speed as a pure autogiro.

A normal conversion to airplane configuration takes place near the maximum speed of the autogiro. If some loss of altitude is permissible, the conversion from autogiro to airplane configuration can take place at a greater speed than that of the high speed of the autogiro. This is accomplished by climbing the autogiro configuration to greater than normal altitude for conversion; then driving the converted airplane configuration to gain flying speed for airplane wing sustentation.

The rotor is flared to a very high angle of attack just prior to landing. This increases the lift of the autogiro configuration to stop the sinking speed and concurrently it creates a very large drag to stop horizontal speed. This landing procedure permits landings with little or no roll in no wind conditions for low disc loading convertiblades and with a short roll distance for high disc loading convertiblades. This characteristic was demonstrated by the many autogiros that were used in the period 1930 to 1942 before helicopters became useful.

The airplane configuration of the convertiblade is not only enhanced by being able to use heliports instead of airports, but it is also more efficient than current airplanes. The area and maximum lift coefficient of airplane wings is controlled by the speed required for take-off and landing. When airborne, at higher speeds, the size of the wing that is required for take-off and landing is a liability. It uses engine power to overcome its weight and drag. When the size of the wing is reduced by increasing the minimum speed at which it must sustain the weight of the airplane, its weight and drag is reduced and the airplane is more efficient. This can make the airplane configuration of the convertiblade more flight efficient than present day airplanes even though the convertiblade must include the means of conversion.

The convertiblade is an ideal aircraft for the following government services: Navy: Aircraft carriers are very expensive and very vulnerable to accurately directed long range missiles. A single massive hit or near miss could completely disable, if not sink, a carrier, but, the convertiblade would permit the use of many small platform type carriers having dispersion safety at the cost of a single carrier. Catapults, arresting gears, and runways are eliminated. This saves weight and complication for the ship. The convertiblade is lighter because it will not be subjected to these added loading conditions. Army: Presently the Army is fully dependent upon the Air Force to clear the skies of enemy bomber, attack, and fighter aircraft. If the Air Bases from which the Air Force airplanes are operating are damaged, the air support for the Army is reduced or eliminated, and the Army is subject to all forms of enemy destruction. If the Army or Air Force have convertiblade aircraft widely dispersed and camouflaged in close communication with the front, they can be dispersed rapidly, and they will be much less vulnerable to enemy damage than present airport based aircraft. Air Force: The Air Force is currently largely dependent upon long runways and large costly installations for their operation of present high speed aircraft. These large establishments are vulnerable to enemy missiles and to the whims of foreign governments. Convertiblade aircraft could drastically change this situation. The large air fields could be dispersed to much smaller units for fuel and weapon storage with many surrounding protected locations for convertiblade aircraft. For the same reasons, fuel and weapon storage units could be rapidly established in foreign countries while the convertiblade aircraft are being flown to the selected units. Marines: The convertiblade can be a versatile transportation means for extremely rapid action by our Marine Force. The convertiblade aircraft gives the Marines a much greater operating range from their shipboard or land base stations. This puts the Marines into a position for fast action so that the enemy is taken by surprise.

The advantages of the convertiblade to commercial aviation include the use of smaller airports closer to populated areas and air transportation at better fuel economies than exist with current aircraft. Because the airports are closer to population centers and they can be dispersed on each side of a city, this greatly reduces the danger of air collision. In addition, the convertiblade provides a measure of safety since the aircraft may be converted to a slow flying autogiro at anytime-even in the event of a wing failure.

DRAWINGS AND SPECIFICATION

FIG. 1 — Airplane configuration-elevation view with autogiro rotor shown dashed.

FIG. 2 — Autogiro configuration-elevation view prepared for take-off.

FIG. 3 — Autogiro configuration - front view.

FIG. 4 — Plan view of wing.

FIG. 5 — Take-off and landing sketches.

FIG. 6 — Hub — elevation view - controls lowered.

FIG. 7 — Hub - elevation view - controls raised.

FIG. 8 — Elevation detail of rotor latch.

FIG. 9 — Collective pitch push-pull support.

FIG. 10 — Upper support for control push-pull members.

FIG. 11 — Detail of universal joint.

FIG. 12 — Wobble plate control arms.

FIG. 13 — Wobble plate pitch link control.

FIG. 14 — Blade pitch control at hub.

FIG. 15 — Pitch link

FIG. 16 — Control phase leads.

FIG. 17 — Phase shift in autogiro position.

FIG. 18 — Phase shift in airplane position.

FIG. 19 — Pylon cradle support and latch.

FIG. 20 — View 20—20 of FIG. 19.

FIG. 21 — Elevation view of pylon at phase shifter.

FIG. 22 — Rear elevation view of base of pylon.

FIG. 23 — View 23—23 of FIG. 22.

FIG. 24 — View 24—24 of FIG. 23.

FIG. 25 — Rear view of cockpit controls.

FIG. 26 — Side view of cockpit controls.

FIG. 27 — Top view of upper cockpit controls.

FIG. 28 — Rear view of blades for right turn.

FIG. 29 — Rear view of blades for nose-up.

FIG. 30 — Rear view of blades for right roll.

FIG. 31 — Elevation view of control transfer unit.

FIG. 32 — Plan view of control transfer unit.

FIG. 33 — View 33—33 of FIG. 32.

FIG. 34 — View 34—34 of FIG. 32.

FIG. 35 — Rear View of engine exhaust controls.

FIG. 36 — Side view of engine exhaust controls.

FIG. 37 — Plan view of blade root and hub-partial.

FIG. 38 13 Plan view of tension-torsion support in blade.

FIG. 39 — Section 39—39 of FIG. 37.

FIG. 40 — Section 40—40 of FIG. 38.

FIG. 41 — Plan view of blade.

FIG. 42 — Elevation view of blade.

FIG. 43 — Section 43—43 of FIG. 44.

FIG. 44 — Pitch change device associated with movement of pylon about hinge.

There are a number of push-pull rods or tubes and bellcranks used in this invention. It is intended to use bearings suitable to accommodate the motion of each joint whether the motion be in a single plane or in two or more planes. Rod end bearings will be used where applicable and otherwise special bearings as required.

Whereever the word fixed is used, it is meant to mean by any means including welding, gluing, bolting, riveting, etc. When the specification refers to "fixed to fuselage," etc., it is meant that intervening structure between the position of fixation and the actual fuselage skin will be provided by bulkheads, stringers, tubular members, gussets, brackets, etc., and that the subject position is fixed relative to the fuselage.

The word actuator refers to a powered device for moving something. It could be as simple as the electromechanical device that opens and shuts windows in a car or the stronger and more complex units that operate on the hammer principle, such as used in a lug bolt motor wrench for automobile wheels.

The design of each convertiblade model will vary and therefore variations in the ratio of the gears; cams; control movements; and angles between levers and associated push-pull members must vary to suit the individual requirements. For these reasons, the illustrated subject units may necessarily be considerably different than those shown in this application in order to meet the requirements of a given convertiblade.

FIG. 1 shows the airplane configuration in flight attitude with the pylon 1 and blades 2 shown dashed to illustrate the autogiro configuration. FIGS. 1,2, and 3 locate other characteristics such as centers of gravity and fin area; important elements; and assemblies. The gross weight center of gravity of the airplane is shown at 10 and the weight empty center of gravity is shown at 13. The lateral center of pressure of the fuselage 3 and fin 8 is at 14. The center of pressure of blades 2 is at 303 and the center of pressure of the combination of blades 2, the fuselage 3, and fin 8 is shown at 304. The jet engine 15 has exhaust deflectors 16 which act to augment controls. The tapered swept back wing is shown at 6. The fuselage is shown at 3, the pilot at 18, and a windshield at 17. The pylon 1 is pivoted at 19 to the fuselage 3, which along with the wing 6 forms the airframe. Its positioning support and lock for the airplane configuration is shown at 21. The fuselage controls as shown at 25.

FIG. 2 shows the jump-off autogiro in a nose down position in preparation for takeoff with the rotor blades 2 stationary in drooped positions. Because of the forward and upward movement of the pylon 1 with blades 2, the center of gravity has moved forward and up. The weight empty center of gravity is shown at 12 and the gross weight center of gravity is shown at 11. The lateral center of pressure moves from 14 up to 308 (see FIG. 2). The pylon is locked in the autogiro positioning support lock 20. A dashed area above and forward of fin 8 shows an area 9 which represents substantially the maximum allowable area for the fin. This is so because the hub assembly 22 and the blades 2 create an aft limit for the fin. The aft landing gear assembly 4 includes two wing tip wheels 26 with shock struts (when desired) 23 each housed in a wing tip 5 which is pivoted to wing 6 on an angular pivot 27. A suitable actuator 28 (shown in FIGS. 3 and 4) controls the movement of wing tips 5 between the autogiro postion illustrated in FIGS. 2 and 3 and the airplane position illustrated in FIGS. 1 and 4. A suitable switch 29 (see FIG. 1) located on a pilot control stick 184 may activate movement of wing tips 5. The forward landing gear wheel 30 (see FIG. 2) is supported by shock strut 31 which is pivoted to the fuselage 3 at 32. Actuator assembly 33 moves the landing wheel 30 between the aft location (nose down) illustrated in dashed lines in FIG. 2 at 34 (position used for jump-take-off) and the forward housed location 35. The dual use of wing 6 for flight and landing saves weight.

The position shown for wheel 30 in solid lines in FIG. 2 is its position after a landing. To visualize the attitude of the ship, consider that line 37 is horizontal. The maximum angle of attack for the autogiro configuration during landing is illustrated when line 36 is horizontal. Such an attitude might be used when landing without appreciable forward roll in calm air. The attitude of the aircraft illustrated in FIG. 2 represents its attitude prior to a jump-take-off and is based on ground line 38 being horizontal. This attitude may also be used for taxiing and for heading the ship into a wind to prevent coning of the rotor blades 2. In this attitude, the engine exhaust is directed up away from the ground. This tends to prevent ground fires.

Wing tips 5 perform three functions: (a) support the two aft landing gear wheels 26; (b) provide auxiliary lateral control: (c) provide auxiliary longitudinal control.

FIG. 2 shows the wing tips 5 each supporting a landing wheel 26 which is fixed to the wing tip. Wheels 26 are housed inside of wing tips 5. Normally no shock strut will be necessary for these wheels 26. This is so because most helicopters land on skiis without shock struts; the wing provides some deflection to assist the tires in reducing the shock load on landing; and the landing load on the aft wheel 26 is light because they are well aft of the center of gravity of the autogiro and any applied landing load rotates the aircraft forward.

In transitional flight when converting between airplane and autogiro configurations, wing tips 5 act as elevators and as ailerons. The pilot's control stick 184 will control the movements of wing tips 5. Lateral movement of the control stick 184 will cause differential movement of wing tips 5 and fore and aft movement of the control stick will cause both the wing tips 5 to move in the same direction. The differential movements will create roll and when moved together pitching moments will be created.

The angle for pivoting wing tips 5 to wing 6 is illustrated in FIG. 3 but is not shown in other figures for clarity of other parts of the structure. The movements between the wing extension positions of wing tips 5 in FIGS. 1 and 4 and for landing gear positions shown in FIGS. 2 and 3 is accomplished while the aircraft is in flight at relatively low speed. The transition from the wheel down position to the wing extension position occurs at takeoff and the reverse movement occurs while coming in for a landing. The aileron and elevator controls to wing tips 5 will not be operative when they are being moved between the wheels down position and wing extension position by activating switch 29 (see FIG. 1). The aerodynamic forces acting on wing tips 5 during their transition between landing gear and wing tip positions as well as the aerodynamic forces acting during high speed flight and when wing tips 5 are acting as ailerons and/or elevators will be taken into account when establishing the exact location of pivot 27—27 (see FIGS. 3 and 4).

The center of pressure of wing 6 is shown at 39 of FIGS. 1,2&4. It may be noted that the center of pressure 39 falls below the center of gravity locations 10 and 13 (see FIG. 1) for the airplane configuration shown in FIG. 1. When in airplane configuration, the rotor will be in its aft location which places the overall center of pressure at 304 (see FIG. 1) which is well aft and above the centers of gravity 10 and 13. For rigid wings, it is desired that the center of pressure 39 of wing 6 be slightly aft of the centers of gravity 10 and 13. However, if wing 6 is so constructed that greater values of lift cause the wing 6 to reduce its angle of attack, it is possible to have a lifting tail airplane. Such an arrangement will be had when the wing flexing is such that it deflects about axis 40—40 of FIG. 4. In this case, wing 6 may be moved forward relative to the centers of gravity 10 and 13 so that its center of pressure is directly under or forward of centers of gravity 10 and 13 depending upon the degree of bump spilling capacity of wing 6.

The wing 6 acts as a stabilizer for the autogiro configuration shown in FIGS. 2 and 3. This is so becuase the airplane wing 6 is located aft of the centers of gravity 11 and 12 (see FIG. 2) of the autogiro configuration. Also, the sweep back of the wing 6 increases the directional and lateral stability for both the autogiro and the airplane.

Forward bulkhead 41 and mating aft bulkhead 42 of FIG. 1 support the structure aft of the pilot including the pylon pivot 19 and autogiro positioning support lock 20. It also supports the wing connection to the fuselage 3 as well as providing support brackets for fuselage located controls.

Air inlets for jet engine 15 are provided on each side of the fuselage 3 above wing 6 at 43 of FIG. 3.

FIG. 6 shows an elevation view of the hub assembly 22 and upper controls with blades 2 at one collective pitch limit and with maximum cyclic pitch control applied. The remaining figures on this page show details of parts located in the upper region of the pylon 1 (pylon tube 51). The hub assembly 22 includes a hub 44 rotating on the pylon 1 at friction free bearings 45 and 46. The outer race of each of the bearings 45 and 46 is fixed in a central bore of hub 44 by projection 47, a spacer 48, and internal nut 49. The inner race of each of the bearings 45 and 46 is supported by sleeve 50 which fits over pylon tube 51 and is welded thereto at 52. Sleeve 50 carries projection 53, spacer 54, and nut 55 to properly position the inner races of bearings 45 and 46 to pylon tube 51. Hub of a miter gear 59 and pitch lever 60 are omitted for clarity.

Hub 44 carries 6 lugs 56 in pairs to accommodate three of the blades 2. Each of the blades 2 includes a blade root fitting 57 to which miter gear 58 is firmly attached. Miter gear 58 meshes with a miter gear 59 which is fixed to pitch lever 60 illustrated in FIGS. 14 and 15. Gear 59 and lever 60 are free to turn on horizontal pin 61 but are restrained from moving axially of pin 61 by collar 62 which is fixed to horizontal pin 61. The opposite end of horizontal pin 61 carries collar 63 which is fixed to horizontal pin 61. Washer spring 373 holds miter gear 59 in close mesh with miter gear 58 to eliminate backlash.

Hub lugs 56 not only carry the horizontal pins 61 but they also restrict the coning angle of the blades 2. This is accomplished by placing a droop and coning stop pin 64 in each of the blades 2 and providing upper stop support 65 and lower stop support 66 in hub lugs 56 for cooperation with the pins 64. Lower ends of pitch links 67 are attached at fitting 68 of pitch lever 60 illustrated in FIGS. 14 and 15, and upper ends of the pitch links 67 are connected to rotating part 69 of wobble plate assembly 70 at 71. One of the pitch links 67 is attached to one of the pitch arms or levers 60 so that the motion is limited to a plane which is perpendicular to horizontal pin 61. This link 67 is stronger than the other pitch links 67 so that it causes the rotating part 69 of wobble plate assembly 70 to turn with hub 44. The connection between the pitch links 67 and the pitch arms 60 for the other two blades 2 is provided for universal motion. Other devices such as "dog legs" or "drag struts" may be used for driving the rotating part 69 of the wobble plate assembly 70 in place of the beefed up pitch link 67 described.

FIG. 7 also shows an elevation view of hub assembly 22 and upper controls with no cyclic pitch control applied.

The rotating portion of 69 of wobble plate assembly 70 is rotatably fixed to the nonrotating part 72 of the wobble plate assembly 70 through low friction bearing 73 which is fixed at its pheriphery to a bore in rotating part 69 through projection 74 and internal nut 75. The inner race of bearing 73 is fixed to non-rotating part 72 of wobble plate assembly 70 between projection 76 and nut 77. The non-rotating part 72 of wobble plate assembly 70 is universally attached at 78 (see FIGS. 6 and 11) to the upper end of collective pitch push-pull tube 79. The non-rotating part 72 of wobble plate assembly 70 carries 2 extending arms 80 and 81, arranged 90° apart as shown in FIG. 12. The arms 80 and 81 have universal attachments 82 to pushpull rods 83 which are attached to control arm 84 at 314 (see FIG. 7). The arms 84 and 85 form an offset part of push-pull tubes 86 and 87 (see FIG. 10), respectively. Push-pull control rod 83 of FIG. 6 was made as short as possible to permit clearance of all parts under the most severe conditions of blade angles. Push-pull control rod 83 shown in FIG. 7 is longer than the rod 83 of FIG. 6 in order to increase clearances.

Rotating fuel distributor tank 88 is fed through a non-rotating tube 80. Tank 88 has a center standpipe 313 fixed to its bottom and open at the top. Tube 80 passes through central block 312 of universal joint 78 and extends up to the top of standpipe 313 for side discharging into tank 88. Sufficient clearance is provided between the outside of tube 80 and inside of standpipe 313 to allow for the angular movement of block 312 relative tank 88. This clearance may be occupied by a packing unit, not shown, to permit pressurizing the fuel. Flexible member 90 in tube 89 below universal joint 78 permits motion of wobble plate assembly 70 relatively to universal joint 78. Extension 91 of the tube 89 passes down through collective pitch push-pull tube 79 to a fuselage located supply tank 136 (see FIG. 22) and pump 135. Distribution tubes 92 are attached to the periphery of tank 88 so as to distribute the fuel to the individual rotor blades 2 indicated at blade root fitting 57. A flexible portion 93 of each of the distribution tubes 92 is provided to permit freedom of movement of the blade 2, about horizontal hinge 61. The flexible tube 93 may be attached to pitch links 67 and pitch lever 60 to prevent it from slinging outboard when the rotor is turning. Tank 88 is fixed to rotating spider 69.

In FIGS. 6 and 8, hub 44 carries a drum skirt 94 which has a slot 95 in its bottom end. At the edge of slot 95 that is opposite the direction of rotation (right to left in FIG. 8), the skirt 94 has a chamfer surface 96 (see FIG. 8). A lever 97 is pivoted at 98 to lugs 99 that are firmly attached to pylon tube 51 as by welds. Lever 97 is slightly less thick than the width of slot 95 and this clearance is increased near chamfer surface 96. A spring 100 urges the lever 97 to engage slot 95. But when hub 44 and skirt 94 are turning the lever 97 will strike the chamfer surface 96 and be ejected. But when the rotation of skirt 94 slows down to a desired rate of rotation, the lever 97 will engage slot 95 and stop the rotor from turning relative to pylon tube 51. The rotor may be made to stop rotating at any desired speed by the interrelationship between the inertia of lever 97 about its pivot 98 the force of spring 100 against lever 97, and the amount that slot 95 is wider than lever 97 at the edge of chamfer surface 96. If the force of spring 100 is sufficient to cause lever 97 to engage slot 95 beyond chamfer surface 96 while rotating a distance which is represented by the difference between the width of the slot 95 and the width of the lever 97, it will stop the rotor from turning. Either a tension or compression spring 100 may be used to urge lever 97 toward engaging slot 95. Either one or a plurality of slots 95 and levers 97, which may be equivalent to the number of blades on the convertiblade, is used for stopping the rotor. In either, the levers 97 and slots 95 are so located that the rotor will be stopped so that the engine exhaust will be least likely to damage the blades. Cable 230 is attached to lever 97 at one end and the other end is led to the pilot cockpit at cockpit control 231 where an over center lever (not shown) keeps lever 97 removed from slot 95 until released. The pilot pulls lever 97 when he desires to let the blades 2 rotate. Although the rotor stop explained above may be used to also maintain the rotor at rest while the ship is on the ground, a normal rotor brake band 104 is illustrated in the event it is desired to use a normal brake band for this purpose.

When the airplane is being retarded in preparation for transition from airplane to autogiro flight, the lever 97 is released by the pilot by pulling cable 230. When lever 97 is moved out of slot 95 by cable 230 against the urging of spring 100, a switch 229 is closed to activate an actuator 306 (see FIGS. 31 and 32) which shifts transfer unit 169 (see FIGS. 25-27) from airplane to autogiro configuration. This shifts the blade pitch to pilot's collective pitch lever 222. (FIGS. 6 and 27).

This invention uses the rotor blades 2 to control both the autogiro and airplane configurations. But there is a phase difference because it is necessary to change the pitch angle of the blade 2 at a given phase position before the blade 2 flaps its maximum angle about its horizontal hinge 61. A blade hinged at the center of rotation about a hinge at 90° to the longitudinal axis of the blade has a natural flapping frequency of once per revolution. This means that a force on the blade tending to create a flapping motion will require 90° of rotation of the rotor before the blade has moved abouts its horizontal hinge to a maximum value. On the contrary, the airplane controls have no phase change. For the convertiblade illustrated herein, the effective axis of the horizontal hinge is at 45°. This is so because of the effect of miter gears 58 and 59 when gear 59 is held in place through the controls which are attached to pitch arm 60.

Gear 58 is fixed to blade root fitting 57 of the blade 2. When blade root fitting 57 cones up about horizontal pin 61, it is rotated toward low pitch by the meshing of the teeth of miter gears 58 and 59. if the ratio is 1:1 between miter gears 58 and 59, the angular reduction in blade pitch is equivalent to the change in coning angle. This is equivalent to a $d_3$ horizontal hinge angle of 45°, and this gives a control log of 45°. This means that there is a 45° phase angle shift between the airplane and autogiro configurations. The convertiblade requires a large change in pitch angle of the blades 2. The gear arrangement in the pitch control system assits in attaining the large blade pitch change without requiring the control system to move a like amount. Many choices are available for specific designs by miter gear ratio selection.

The control lead angles for the airplane and autogiro configurations are illustrated in the plan view of FIG. 16 where the center of rotation is at 107. These values are representative for a 1:1 gear ratio. The lead angle for other ratios would be different, and the control transfers may be different. If the wobble plate assembly 70 is titled so that the pitch link 67 that is above the fitting 68, FIG. 14, is in its lowest position, the blade will be at its highest cyclic pitch at position 106 in FIG. 16 but the blade will not have reached its highest coning position until 45° later. The angle of control lead for the airplane is illustrated by the angle 108, and the angle of control lead for the autogiro will be 45° greater as represented by the angle 109. At position 105, the blade is at maximum cyclic pitch. Thus, a 45° phase shift is made in the control system between the airplane and autogiro configuration. The shift between airplane and autogiro configurations involves additional problems; the controls that alter the pitch of the blades are actuated by a given cockpit control for the airplane configuration and by another cockpit control for the autogiro. For example, the collective pitch control of the autogiro becomes roll control of the airplane. The controls of the rotor consist of three push-pull tubes 79, 86, and 87 that are housed inside the pylon tubes 51 as illustrated in FIGS. 17 and 18. Tubes 86 and 87 control airplane direction and pitch or autogiro roll and pitch. Allocation depends upon gear ratio and rotor rotation.

The shift in the control lead is accomplished by turning the collective pitch push-pull tube 79 at the time that the pylon assembly 1 is latched in its horizontal airplane position, see FIGS. 1,17,18, and 21. The universal joint 78 at the top of the collective pitch push-pull tube 79 rotates the entire non-rotating part of wobble plate assembly 70, FIG. 7. Specifically, an arm 112 (see FIGS. 17, 18 and 21) is fixed to and rotates push-pull tube 79, universal joint 78, and extending arms 80 and 81. The upper ends of the push-pull rods 83 are universally attached to the underside of extending arms 80 and 81 at the universal attachments 82. The lower end of each of the push-pull rods 83 is attached to a corresponding one of the arms 84 with single plane hinges at 314 (see FIG. 6). This causes arms 84 to follow underneath universal connections 82.

Push-pull members 86 and 87 are connected to their respective levers 150 and 151 (see FIGS. 22, 23, and 25) at the base of the pylon tube 51 at pivots 149 which permit the twist motion required. This causes single plane pivot 314 and universal pivot 82 to rotate push-pull tubes 86 and 87 about the center of push-pull tube 79.

As a safety feature, an adjustable bulkhead 110 (see FIG. 10) is fixed to collective pitch push-pull tube 79 near the hub 44 to assure the rotational movement of control push-pull tubes 86 and 87 within pylon tube 51 and to hold the radial position of push-pull tubes 86 and 87 which are otherwise located radially only by tube 79 and pylon tube 51. Since bulkhead 110 cannot be located at universal joint 78, it will rotate too much for any lower location. In order to prevent the over rotation of bulkhead 110 from binding tubes 86 and 87 where they slide in suitable mating apertures in bulkhead 110 the mating apertures will be elongated to allow tubes 86 and 87 to remain straight from their fixed rotational position, relative to the pylon tube 51, at hinges 149 to their attachment to push-pull rods 83 at the hub.

Thus, the control action at the wobble plate assembly 70 may be shifted in angular phase relative to the angular phase position of the controls at the base of the pylon 1 to which the cockpit controls are attached.

The phase shift is automatically accomplished when the pin 126, which latches the pylon 1 into airplane configuration, is moved into latched position. Auxiliary manual means for causing the control shift may also be used as back-up system. The phase shift also occurs in reverse when the pin 126 which latches the pylon 1 into airplane position is removed.

FIG. 21 shows the shape of the slot in the pylon which accommodates the movement of lever arm 112. The actuator 111 of lever arm 112 is also shown in FIG. 21. In airplane flight, the lever arm 112 will be in the elongated slotted area 114 and in the autogiro flight regime it will be in the area 115 of the slot. During jump-take-off, the lever arm 112 will be near the bottom of the slot and during transition it will move from the area 115 up to the top of the slot where one side of the slot widens at 116 to provide more tolerance and assistance in the final shift to airplane control position. Holding lug 121 on the pylon tube 51 for retaining pylon tube 51 in airplane configuration is shown above right and holding lug 242 on the pylon tube 51 for retaining pylon tube 51 in autogiro position is shown lower left. Lug 310 on the pylon tube 51 is associated with a pylon motion damper.

Actuator 111 (see FIGS. 17,18, and 21) for the arm 112 is fixed to pylon tube 51. it activates notched sliding member 24 (see FIG. 21), which is slidably attached to pylon tube 51 at 113 and 305. Sliding member 24, moved by actuator 111, moves arm 112 from the left airplane position to autogiro position to the right when the pin 126 which holds the pylon 1 in airplane position is withdrawn and contacts 127-128 (see FIG. 19) have parted.

The reverse action takes place when transferring from autogrio position to airplane position at the area 114. Lever 112 can also be moved by manual means (not shown) when necessary, by overpowering the actuator 111.

Pylon holding devices 20 and 21 are shown in FIGS. 19 and 20. Pylon tube 51 is resting in saddle 118 which is fixed to fuselage 3 by tubes 119. Saddle 118 is made in two parts which are joined with two separated spacers 120. A holding lug 121 is firmly attached to pylon tube 51 at 122. Any suitable padding material is fixed to saddle 118 at 123 to prevent pylon tube 51 from having a metal to metal contact. The upper edges of the saddle 118 are spread apart to provide guidance for pylon tube 51 at the instant of engagement with saddle 118. A contactor 124 closes an otherwise open circuit when holding lug 121 which is fixed to pylon tube 51 is nearly seated. This activates actuator 125 which forces taper pin 126 into mating taper holes in the lower flanges of saddle 118 and in pylon holding lug 121. This latches the pylon tube 51 to the fuselage 3 when it it operating in airplane configuration. At the time that taper pin 126 is driven home, the contact 127 engages mating contact 128 and thereby closes a circuit to activate actuator 111. Actuator 111 moves lever 112 to the left to the area 114, FIG. 21, and thereby creates a 45° phase shift in the controls.

The pilot activates a switch at cockpit control center 231 (see FIG. 1). This activates actuator 125 (see FIGS. 19 and 20) in reverse for changing from airplane configuration to autogiro configuration. Actuator 125 extracts taper pin 126 from its mating taper holes at the lug 121. When arriving into autogiro lock 20, the taper pin 126 will be activated as described above for mating with the lug 242 rather than the lug 121. Suitable cockpit indicators will show the pilot that each individual control function is completed as performed. It is realized that more positive means may be required for activating this important element of the aircraft. It may include striking means to insert and extract the taper pin 126 in the event it is loaded at the time of activation. I intend to employ any means including direct mechanical means to the pilot's cockpit as a back-up for final activating taper pin 126 or its equivalent. As illustrated in FIGS. 19 and 20, actuator 125 is attached to one of the tubes 119. The actuator 125 actuates lever 129 which is pivoted to a fuselage fixed bracket at 130. The operating circuitry is shown in FIG. 20 where contact switch 124 closes the circuit between conductors 131 and 132. The power circuit for advancing taper pin 126 is to close the conductors 131 and 132 and the power circuit for extracting pin 126 is to close the conductors 133 and 134. The switch 365 (see FIG. 1) is located in the cockpit at the cockpit control center 231.

The controls at the bottom of the pylon tube 51 are illustrated in FIGS. 22,23, and 24. FIG. 22 shows a rear view of the pylon tube 51 in an upright position with collective pitch push-pull tube 79 in the center and push-pull tube 86 to the right. Push-pull tube 87 is back of push-pull tube 86. Tube 86 is shown in this view as if it were in the plane of the paper passing through the C of the pylon tube 51 and the control tube 79. This arrangement of the view shows the true clearance between extension 148 and bulkhead 138. Fuel tube 91 for supplying fuel to the hub mounted distributor tank 88 is shown at 91 with flexible section 93 to permit rotation and vertical movement of collective pitch push-pull tube 79. Fuel tube 91 is supplied by pump 135 from fuel tank 136 having suitable filler cap 137. Pump 135 is activated by switch 315 (see FIG. 1) in the cockpit control center 231.

The lower end of the collective pitch push-pull tube 79 is attached to a co-axial bulkhead 138 (see FIG. 22) in pylon tube 51 through bearings 139. Bulkhead 138 is prevented from rotating by a notch therein mating with a spline 140 which is firmly attached to the inner face of pylon tube 51. Bulkhead 138 moves axially for collective pitch change. The outer races of bearings 139 are fixed to a bore in bulkhead 138 and the inner race of each of the bearings 139 is fixed to the outer surface of collective pitch push-pull tube 79 at its lowest extremity. Collective pitch bellcrank 143 is pivotally attached to the lower end of a link 142 at pivot 141. The upper end of link 142 is attached to bracket 145 at 146. Bracket 145 forms a parallel slot for attachment to link 142 at 146. Bracket 145 is a fixed part of bulkhead 138. Bulkhead 138 is provided with apertures 147 to permit extensions 148 of control members 86 and 87 passage for connections at 149 (FIGS. 22 and 23) to bellcranks 150 and 151. Bellcrank 143 is pivotally mounted at 159 to bellcrank supports 160 which are welded by pylon tube 51. Bellcranks 150 and 151 are pivotally supported by pedestals 161 and 162 which are firmly attached to bulkhead 138 as by stud bolt 163. It should be noted that pivot connections 152 to the activated arm of bellcranks 143, 150, and 151 are near the pylon pivot 19. Because the action motion of bellcranks 143, 150, and 151 is directed generally in a direction which is parallel to the pylon pivot 19 and because the ends of the bellcranks 143, 150, and 151 lie near pylon pivot 19, there is little changes in the controls when the pylon 1 moves between its upright autogiro position and its horizontal airplane position. Each of the extensions 148 has a connecting pivot 149 at its lower end and a plug 154 at its upper end which is secured internally the cooperating push-pull tubes 86 and 87 with screws 155. Bellcranks 150 and 151 move up and down with bulkhead 138. Their pivot connections or fittings 152 moves above and below pylon pivot 19. The pylon tube 51 is locally reinforced with internal doublers 157 and external doublers 158 at and near the pylon pivot 19 to distribute the concentrated load at the pivot 19 into the pylon tube 51. Suitable rosette welds 164 may be used to secure doublers 157 and 158 to pylon tube 51 near pivot 19. A machined or forged fitting, not shown, may be used to accommodate the loads at and near the pivot 19 instead of the welded fitting if desired. The pylon tube 51 is pivoted to fuselage structure 156 by the pivot 19.

Laterally disposed push-pull tubes 165, 166, and 167 (see FIGS. 24 and 25) are attached to pivot connections 152 of bellcranks 150, 143, and 151 respectively. These push-pull tubes 165–167 have freedom of twisting movement to accommodate the 90° pylon motion through each having a twist bearing 153 (see FIG. 25).

FIGS. 43 and 44 show the details of push-pull tube twist bearing 153. The bearing 153 includes an inner telescoping tube 320 and outer telescoping tube 321, a pin 322, and cams 323 in the outer tube 321. Pin 322 fits tightly in tube 320, but its ends move in cams 323 when tube 320 is rotated relative to tube 321 by reason of pylon 1 rotating about its pivot 19. The combination of rotation of tube 320 relative of tube 321 and the shape of the slot of each of the cams 323 in tube 321 determine the changes in length of each of push-pull members 165, 166, and 167. Each of the end fittings of push-pull members 165, 166, and 167 have single plane motion; therefore, all twist movement takes place in the twist bearing 153. The alignment of the tubes 320 and 321 is accomplished by a close fit between the overlapped area between the inner face of tube 321 and the outer face of member 320. The ends of the slot of each of the cans 323 may be locally formed as illustrated at 327 at each of its ends to eliminate torque forces in the push-pull tubes 165, 166, or 167, FIG. 25, when the pylon, is in the autogiro or airplane configuration position.

FIG. 43 shows section 43-43 of FIG. 44. It illustrates the cut out material for the slot of the cam 323 at 323' and the remainder of the tube 321 for transmitting the load at 324.

The twist bearings 153 have a dual function. First, they permit the fitting at one end of each of the push-pull tubes 165-167 to rotate 90° more or less to adjust for the twist motion between the fitting on one end of the push-pull tube which is oriented with the pylon 1 and the fitting on the other end of the push-pull tube which is oriented with the fuselage 3.

In addition, the twist motion which occurs for push-pull tubes 165, 166, and 167 may be incorporated into a cam to cause the push-pull tubes 165-167 to lengthen or shorten as desired as the pylon 1 moves from its autogiro configuration position to its airplane configuration position. This is based on maintaining cockpit controls in a fixed position. Actually they may be varied for pilot corrections as needed to account for variations in rotor speed, forward flight speed, and for differences required by the direction of transistion. The change created by the pylon movement will reverse when the pylon motion is in the opposite direction.

It may be desirable to apply a suitable cam action to any of the three rotor controls, but it is especially important to automatically reduce the pitch angles of the rotor blades as the transistion takes place between erected autogiro pylon configuration and horizontal airplane pylon configuration. Conversely, it is important to have automatically increasing pitch when changing from airplane to autogiro configuration. This is so because the flow through the rotor increases with the product of the sine of the angle of the aft tilt of the rotor and the forward speed. When fully back the mean induced angle of the blade section at the longitudinal center of procussion of the blade will be V/K $\omega$R where V is the forward speed, K is the % blade radius to the aerodynamic center of procussion, and $\omega$R is the rotational tip speed of the rotor. Thus, the cam for the collective pitch change member 153 for push-pull member or twist bearing 166 (FIG. 25) will lengthen the push-pull tube 166 as the pylon 1 moves from autogiro configuration position to airplane configuration position in order to lower the pitch. Conversely, the cam movement of member or twist bearing 153 for push-pull member 166 will shorten when the pylon 1 moves from a horizontal airplane configuration position to an upright autogiro configuration position. The shape of the cam 323 will be substantially that of a sine function.

The control systems that are housed in the fuselage are illustrated in FIGS. 25, 26, and 27. In order to simplify an understanding of the controls in the fuselage, they are illustrated in three views all on one page for easy reference. FIG. 25 shows a rear elevation view; FIG. 26 shows a side elevation view; and FIG. 27 shows a plan view. The side and rear views are the same scale. The rotor controls emanating from the base of the pylon 1 in push-pull tubes 165, 166 and 167 connect to control transfer units 168, 169, and 170 respectively.

The purpose of the control transfer units 168-70 is to shift the controls coming from the rotor blades 2 to the proper cockpit controls that control (a) the autogiro or (b) the airplane. The details of the control transfers will be explained later. It is sufficient to say here that when the transfer units 168-170 are all moved to one specific position the cockpit controls to the rotor will function properly for controlling the autogiro and when moved in the opposite direction the cockpit controls will be proper for controlling the airplane. The connections of the control system for controlling the airplane occurs at the moment that pylon 1 is latched in a horizontal position to fuselage 3. This system will first be followed through the airplane controls to the cockpit, then through the autogiro controls to the cockpit. Moving members or tubes 165 and 167 away or the tube or member 166 toward the base of pylon 51 are assumed to create the following control actions on the autogiro or airplane configuration: (Changes in control lead or lag, $\alpha$3 angle, gear ratio, or direction of rotation may change the allocations below and the phase shift.)

| MEMBERS | AIRPLANE | AUTOGIRO |
|---------|----------|----------|
| 165 | Nose down | Right roll |
| 166 | Right roll | High collective pitch |
| 167 | Left rudder | Nose up |

Push-pull member 165 is attached to bellcrank arm 171 which is a part of transfer unit 168 which is free to pivot about its coaxial center to transfer the movement from arm 171 to offset arm 173 which is pivoted to push-pull tube 174 at 316. The tube 174 carries a reduced diameter tube 175 to provide clearance with adjacent tubes. Reduced diameter tube 175 carries an end pivot juncture 176 with support plates 177 which carry the loads and motions from push-pull member 174 to push-pull member 178 which is attached to bellcrank 179 at pivot connection 180. Bellcrank 179 is fulcrumed to the fuselage 3 at 181. The lower arm of bellcrank 179 carries universal motion pivot at 182 which attaches bellcrank 179 to push-pull member 183 which is universally pivoted to the lower end of control stick 184 at 361. The control stick 184 is universally pivoted at 186 to torque tube 185 which is free to rotate in supports 187 and 188 which are fixed to fuselage 3. Forward support 187 carries retaining rings 189 which are fixed to torque tube 185 and they prevent axial movement of torque tube 185 relative to fuselage 3.

Following through the controls to evaluate the proper direction of motion: Rotating the arms 171 and 173 to the right causes a nose down control to the airplane. This motion causes push-pull tubes 174 and 178 to rise causing bellcrank 179 to rotate to the left, placing tension in push-pull member 183 causing control stick 184 to move forward which will produce nose down for the airplane.

Push-pull member 166 will now be traced through the controls for airplane confiruration. Push-pull member 166 is pivotally connected to arm 190 at 191. Arm 190 forms a part of the transfer unit 169 which is coaxially pivoted to provide an offset bellcrank comrised of arm 190 and an arm 192. Arm 192 is pivotally connected to push-pull member 193 at 194. The lower end of push-pull member 193 is pivotally connected to torque arm 195 at 196. Torque arm 195 is fixed to torque tube 185. When the control stick 184 is moved to the left in FIG. 25, push-pull member 193 moves down causing control shift member 169 to rotate to the left causing push-pull member 166 to move away from the pylon 1. This checks out the table above.

Push-pull member 167 will be traced for airplane configuration. Push-pull member 167 is pivotally connected to arm 197 at 198. Arm 197 forms a part of transfer unit 170 which is coaxially pivoted to provide an offset bellcrank comprised of arm 197 and an arm 199. Arm 199 is attached to push-pull member 201 at 200. The lower end of push-pull member 201 is attached to bellcrank 202 at 203. Bellcrank 202 is fulcrumed to the fuselage 3 at pivot 204. The lower arm of bellcrank 202 is pivotally attached to push-pull member 210 at pivot 360. The forward end of push-pull member 210 is pivotally attached to rudder pedal bar 205 at 206. Rudder pedal bar 205 is pivoted at its center between the pilot's feet so as to eliminate a connection to the right rudder pedal. The support of the fuselage 3 for the left rudder bar 205 is indicated at 207.

When left rudder bar 205 is applied, the push-pull member 210 is moved to the left in FIG. 26; this causes right hand rotation of bellcrank 202 causing push-pull member 201 to move down. This in turn causes left hand rotation in FIG. 25 of control shifter 170 causing left hand movement of connecting link 167 which is movement away from the base of the pylon tube 51.

The autogiro controls will now be traced through the system in the same order as was used in tracing the airplane controls. Referring to control transfer unit 168 where push-pull member 165 is connected to lever arm 171, the transfer unit 168 carries offset arm 208 which is conneced to push-pull member 209 at 211. The lower end of push-pull member 209 is connected to torque tube arm 212 at 213. This rotates torque tube 185 which carries control stick 184 through straddled pivot 186. Check of system: moving control stick 184 to the right in FIG. 25 rotates torque tube 185 in right hand rotation when viewed from the rear, this causes arm 212, push-pull member 209, and arm 208 to rise causing transfer unit 168 to rotate to the right (clockwise in FIG. 25). This causes arm 171 and push-pull member 165 to move to the left which complies with the table above.

Referring to control transfer unit 169 push-pull member 166 is attached to arm 190 which rotates control transfer unit 169. The control transfer unit 169 carries offset arm 214 which is pivotally attached to push-pull member 216 at 215. The lower end of the push-pull member 216 is pivotally attached to bellcrank 217 at pivot 218. Bellcrank 217 is fulcrumed to fuselage 3 at 219. The lower arm of bellcrank 217 is pivotally connected to push-pull member 220 at 221. The forward end of pushpull member 220 is pivotally attached to collective pitch lever 222 at 223. Collective pitch lever 222 is fulcrum pivoted to fuselage 3 structure at 224.

Weight 225 is vertically slidable with frictional resistance on collective pitch lever 222. The friction is such that the pilot can move the weight 225 but it will remain in its positioned location. Spring 226 is adjustably attached to collective pitch lever 222 at 227 at one end adjustable connected to bulkhead 41 of fuselage 3 at 232 at it's other end. The function of weight 225 and spring 226 is as follows: when slowing the airplane down and during jump-take-off it is desirable to limit the accelerations created by excessive pitch angle of the blades 2. This is accomplished by the inertia action of weight 225 about pivot 224 and the spring force action of spring 226 about pivot 224 in the opposite direction. Any forces which decelerate the aircraft cause collective pitch lever 222 to move toward low pitch. On the other hand, spring 226 creates a force tending to force the blades 2 into higher pitch. By properly adjusting spring 226 at the front end at 227 or aft at 232 and the position of weight 225, a desired deceleration can be established. When it is desired to control the vertical acceleration during the jump-take-off, a similar arrangement can be established. When rotor rotation is reversed or controls shifted to the other side of hub lugs 56, the weight of the wobble plate assembly 70 and attachments also tends to reduce the blade pitch with accelerations related to rotor thrust. In this case, the weight 225 will be located on a forward extending member 233 shown dashed in FIG. 26. In the latter case, the weight 225 is moved fore or aft to adjust the interrelation between spring 226 and weight 225.

Check the system: Moving the collective pitch lever 222 aft causes push-pull member 220 to move forward. This causes bellcrank 217 to rotate to the right (clockwise) in FIG. 26 and to lower push-pull member 216. This causes transfer unit 169 (FIG. 25) to rotate to the left and to move push-pull member 166 to the left as recited in the table above.

Referring to control transfer unit 170 to which push-pull member 167 is connected through arm 197, an offset arm 234 is connected to push-pull member 178 at pivot 236. The lower end of push-pull member 178 is attached to bellcrank 179 at 180. Bellcrank 179 is fulcrumed to fuselage 3 at 181. The lower arm of bellcrank 179 is attached to push-pull tube 183 at pivot 182. The forward end of push-pull tube 183 is attached to the lower end of control stick 184 at pivot 361.

Check of system: moving stick 184 aft causes push-pull member 183 to move forward. This causes bellcrank 179 to rotate to the right (clockwise in FIG. 26) causing push-pull member 178 and arm 234 to move down causing control transfer member 170 to rotate to the left (clockwise in FIG. 25). This moves push-pull member 167 to the left which is as stated above.

FIGS. 25 and 26 illustrate an automatic system for retarding the angular motion of pylon 1 about pivot 19 prior to seating in one of the saddles 118 illustrated in FIGS. 19 and 20 and FIGS. 1 and 2 at 21 and 20, respectively. This is accomplished by employing a double acting hydraulic cylinder pump, activated by the angular movement of pylon 1 relative to fuselage 3, which supplies a like double acting hydraulic receiving cylinder which is connected to the fore and aft control system. This changes the blade pitch angles so as to create control forces acting on the rotor to retard its movement. The faster the relative movement of the pylon 1 and the closer it comes to its appropriate saddle 118 the greater will be the force on the fore and aft control system attempting to retard the relative movement.

Cylinder 252 is pivoted at 253 where its lower end is attached to bulkhead 42 through lugs 309 fixed to fuselage 3. Piston 254 moves inside cylinder 252 and carries piston rod 255 which is pivotally connected at 256 to lugs 310 fixed to pylon tube 51. This cylinder 252 is activated by movement of pylon tube 51 about pivot 19 causing fluid to flow to cylinder 235 through tube 250 when the pylon 1 is moving up and through tube 251 when the pylon 1 is moving down. The return flow from cylinder 235 is through the opposite tube.

Double acting hydraulic cylinder 235 is fixed to bulkhead 42 of fuselage 3. Cylinder 235 has a piston 238 and driver rod 239 which connects to link 240 at pivot 241. The other end of link 240 connects a bellcrank 179 at pivot 243. Piston 238 is pierced with three apertures: one, illustrated, includes an adjustable pop-valve 244. It permits flow from the forward side of piston 238 to the aft side of the piston 238. Another adjustable valve (not shown) is the reverse of the valve 244 and permits fluid flow from the aft side of piston 238 to its forward side. Both of these valves may be set by adjusting the force on springs 246 by turning nut 247 as desired. Pop-valves (one shown at 244) limit the pressure that builds up in aft or forward portion of cylinder 235 respectively. These pop-valves permit over control by the pilot when desired. A metering pin 248 is fixed to each end of the cylinder 235 and it passes through the other aperture (hole 249) in piston 238. The metering pin 248 is turned down at its center so that it is much smaller in diameter than the hole 249 in the piston 238. This permits the fluid in the cylinder 235 to move from one side of the piston 238 to the other side with little pressure differential between the two sides. But when piston 238 approaches either end of cylinder 235 the space between the outside diameter of metering pin 248 and the hole 249 in piston 238 is reduced so that the flow from one side of the piston 238 to the other is restricted. This builds up pressure against piston 238.

Thus, as the rate of movement of pylon tube 51 increases or as it approaches the upper autogiro or lower airplane saddle 118, its angular movement about pivot 19 will be reduced by creating a force on the pilot's fore and aft autogiro control system which will oppose the movement. The force that the pilot places on his controls to cause the rotor system to move the pylon 1 from one position to the other will be automatically corrected by the influence of the retarding system established above. The pilot will maintain a predetermined force on the control stick which will cause the pylon 1 to complete its transition yet declerate as it approaches either saddle 118 designated on FIGS. 1 and 2 at 21 and 20 respectively.

When the airplane is being retarded in preparation of transition from airplane flight to autogiro flight the lever 97 which stops rotor blades 2 from turning, FIGS. 6 and 8, has been moved from slot 95 by pulling on cable 230 by cockpit 231 (see FIG. 1). This closes the circuit at switch 229 (see FIG. 6) and thereby causes actuator 306 (see FIG. 31) to transfer the controls of the collective blade pitch from airplane roll to autogiro collective pitch control.

Spring 100 automatically causes lever 97 to reengage slot 95 when cable 230 is released by the pilot. When lever 97 engages slot 95, the switch 229 is opened. This closes a circuit to actuator 306 which through other circuits (not shown) transfers the collective pitch controls of transfer unit 169 to airplane roll control from autogiro collective pitch.

FIGS. 28, 29, and 30 are rear views of the blades 2 in the airplane configuration showing the movements of blade angle changes for the three controls of the airplane. FIG. 28 illustrates the pitch change positions of the blades for a right turn. The pitch change for blade position 257 is toward higher pitch and the pitch change for blade positions 258 and 259 is toward lower pitch but the value of pitch change for blade positions 258 and 259 is half that for blade position 257. The resulting control forces are indicated by the length of the associated force arrows illustrated at each rotor blade position. In FIGS. 29 and 30, the blade positions are indicated by the same numbers and in the same order as for FIG. 28. The associated force vectors also indicate the relative control forces acting on the blades. FIG. 29 illustrates the change in blade angles and the relative forces on the blades during a pull-up. FIG. 30 illustrates the change in blade angles and the relative forces on the blades during a right roll.

FIGS. 31, 32, 33, and 34 show one control transfer unit such as those illustrated at the control units 168, 169, and 170 of FIGS. 25 and 26. The unit is suitably fixed to fuselage 3 through structural support members 340 and 341 and bulkheads 41 and 42. Member 342 interconnects structural members 340 and 341, and it carries a pivotal support 343 for an over center compression spring device 344 which assists in maintaining positive engagement of center shifting dog member 345 to the left mating dog 346 or to the right mating dog 347. All of the modified dog clutch members 345-347 ride on pin 348 upon which they are permitted to rotate or pin 348 may rotate in bearings 349 and 350 in structural support members 340 and 341. Washers 351 and cotter keys 352 retain pin 348 in structural support members 340 and 341. Activating bar 353 is a part of a support member 354 to which is attached over center compression spring device 344 at 355. Activating bar 353 carries a projection 356 which fits rectangular turned slot 357 of shifting dog member 345. When activating bar 353 is moved away from either limiting motion position left or right, projection 356 causes shifting dog member 345 to follow its movements. Also, when shifting dog member 345 is engaged with left mating dog 346 or right mating dog 347, over center spring 344 and projection 356 acting in groove or slot 357 maintains the engagement without other assistance. It may be noted from FIGS. 31, 32, and 33 that the unengaged dog member is limited in its freedom to rotate since the driving portion 260 of any of the dog members never fully disengage. One part may rotate ± the angle 359 illustrated in FIG. 34 where it is stopped when the two male elements 260 contact each other. Each dog clutch has two pair of male members 260 and two pair of female apertures 261. The feature of this dog clutch is twofold. First: all engaging surfaces are tapered relative to each other until the parallel dog clutch surfaces are in final mating position. The sloping surfaces guide the dogs to the proper rotational positions. The other feature is: neither dog clutch is ever fully disengaged. This assures positive reengagement yet it permits full motion of the control system to which the idled dog clutch member is attached.

Each of the dog members 345, 346, and 347 carries a lever arm 262, 263, and 264 respectively. Lever arm 262 connects to a push-pull member that connects to one of the bellcranks 150, 151, or 143 in the base of pylon tube 51 shown in FIGS. 22 and 23. Lever arm 262 represents the central lever in each of the transfer units 168, 169, or 170 such as the arm 171 of the transfer unit 168, for example. Lever arm 263, which corresponds to the arm 208 of the transfer unit 168, for example, connects to a push-pull member (the member 209 of the transfer unit 168, for example) which controls a function of autogiro flight and lever arm 264, which corresponds to the arm 173 of the transfer unit 168, for example, connects to a push-pull member (the member 174 of the transfer unit 168, for example) which controls a function of airplane flight.

FIGS. 35 and 36, illustrate an auxiliary control system which attains control forces by deflecting the engine exhaust stream. There are a total of 8 of the deflectors around engine exhaust 267 (2 of which are illustrated in FIG. 35 and 3 of which are illustrated in FIG.

36). Four of the deflectors 265 are marked "A" at the vectors in FIG. 35 and four of the deflectors 266 are marked "B" at the vectors. The last letter of the markings of the vectors represent the type of control that will be applied when the deflectors 265 and/or 266 are deflected into the jet stream of the engine exhaust 267. When a deflector is forced into the jet stream, an equal and opposite force is exacted against the inside of the deflector as indicated by the arrows. The letters "D" represent a nose down control force, "L" represents a left turn force; "R" represents a right turn force; and "U" represents a nose up control force. When all deflectors marked "A" are activated into the jet stream of the engine exhaust 267, the aircraft will be forced into a right roll and when all deflectors marked "B" are activated into the exhaust stream the aircraft will be forced into a left roll.

For purposes of illustration, each individual deflector or other auxiliary control will be activated by an individual mechanical-electric unit which is energized by the power supply of the aircraft whose switching is controlled by switching gyroscopes or by the pilot controls—momentarily or continuously. This system applies to either the exhaust deflectors or to the aileron-elevators at the wing tips 5. The gyroscope or manual switching gear activates the motor to move its control surface or deflector into the jet stream. When the movement which activated the gyroscope has stopped or reversed, another circuit causes the surface or deflector to return to its position which aligns with the wing 5 or tail pipe 268 respectively.

In detail, the deflectors 265 are attached to right support members 269 which are pivoted on lug 228 by a pin 270. The lug 228 is fixed to engine case 280. An upper curved portion 271 of the support member 269 is firmly fixed to the deflector 265, and control arm 272 of the support member 269 is connected to operating push-pull member 273 at 274. An actuator 275 is supported on extension 276 which is pivoted to support member 278 at 277. Support member 278 is firmly fixed to motor case 280. Each of the actuators 275 and its support members may be located in the fuselage 3 more remote from activating or control arm 272 if desired to reduce their parasite drag. Support members 281 for the deflectors 266 are mirror duplicates of the support members 269 including the actuators 275. Three electric supply wires 282 connect to a gyroscopic sensor and reverse device 283. The gyroscopic sensitive switching device 283 is fixed to the fuselage 3 so that it will be affected by movements in the plane that it must correct by switching the proper circuit in the three wires 282 using power source 284. A total of three gyroscopes is required. One for angular movements that lie in a fore and aft vertically disposed plane to activate AD and BD together or BU and AU together; another to activate AR and BR together or AL and BL together; the third gyroscopic switch activating device 283 will be used to correct for roll by closing the circuit which either contains the four deflectors 265 to correct for right roll or the four deflectors 266 to correct for left roll. Each switching system contains a device which returns the actuators 275 to their straight back position when the disturbance, for which a correction has been made, ceases to exist. The connection for the control units described above will be with parallel circuits so that the power supplied to each unit will be substantially the same. The gyroscopes may be used to activate wing tips 5 differentially to correct for roll or in the same direction to correct for pitch.

Another method for having auxiliary controls for stabilizing the autogiro configuration during transition is to use the wing tips 5 for lateral and fore and aft control. The lateral control would be accomplished as taught in U.S. Pat. No. 1,989,291, ie., by activating actuators 28 (see FIG. 3) differentially and fore and aft control by activating actuators 28 in the same direction-together. The latter works because the tips 5 of swept wings 6 are aft of the center of gravity 11 or 12 (see FIG. 2) of the autogiro and 10 or 13 (see FIG. 1) of the airplane. These auxiliary controls are primarily to keep the aircraft steady during the short period of time (a few seconds) that it takes to transform the rotor blades 2 between their upright spread out positions when operating as an autogiro and their trailing position when operating as an airplane. Any of these auxiliary controls may be activated by the control stick and the rudder pedals of the aircraft as direct manual connections; by hydraulic interconnected systems; or by mechanical-electrical devices which may be electrically powered and activated by gyroscopic sensors. Also, they may be turned on only during the rotor transition and remain in nuetral position at other times, or they may be activated at or near the limiting movement of the control member 184. In this case, the switches are associated with torque tube 185 and control stick 184. For lateral control where wing tips 5 are differentially activated: a projection 366 (see FIG. 26) is fixed to torque tube 185 and an activating switch 367 is fixed to fuselage 3 to each side of projection 366. The spacing is arranged so that projection 366 will activate the switch 367 located on the right side when the control stick 184 is moved hard to the left and conversely the switch 367 located on the left side will be activated when the control stick 184 is moved to the right. The actual position at which the switches 367 are activated relative to the lateral control stick location can be set as desired. It may be desirable to have rheostats substituted for the switches 367 so that the position of the stick 184 would control the rapidity of the response.

A similar arrangement is shown for fore and aft stick control which activates the wing tips 5 in the same direction rather than differentially. In this case, fitting 368 is pivotally attached to stick 371 184 above its pivot connection 186 to torque tube 185. Member 368 has an extension 369 supported at 370 moving parallel to torque tube 185. Two switches 371 are attached to torque tube 185. Each is activated by extension 369. When control stick 184 moves at or near its forward position the forward switch is activated and when moved near its aft limit the aft switch 371 is activated.

Like the description for the lateral control, the switches 371 may be made to be activated at any stick position between its neutral position and its most forward for one switch or for the other switch its most aft location. Likewise, suitable rheostats may be substituted for the switches.

FIGS. 37-42 inclusive describe the blade 2. In order that all blades will be at their proper pitch, it is desirable to eliminate as much friction as possible from movement of the blades about their pitch axis. This has been accomplished in the past with tension-torsion rods in various forms. My U.S. Pat. No. 2,509,367, dated May 30, 1950 disclosed one form of tension-torsion rods. The tension-torsion assembly is flexible for twisting motions yet it attaches the blade to the root fitting to take the large centrifugal forces involved. This system greatly reduces the frictional forces in otherwise heavily loaded bearings. The blade pitch changes required of the convertiblade are much greater than the blade pitch change requirements for a helicopter or jump-take-off autogiro. The twist per unit length of a tension-torsion rod varies inversely with its length. Also, the shear strains in tension-torsion members increase directly with the diameter of the individual members that make up the tension-torsion assembly. With this knowledge I plan to make up the tension-torsion members out of small diameter wire or filaments.

The individual strands in the tension torsion rod assembly will be wound around bars at each end after passing through the tubular members. This aids in attaining uniform operating stress in the wires or filaments. It also provides a safety factor in the event of glue shear failure between the wire filaments and the inside of the tubular members. The tension-torsion assemblies will be fixed to their associated holding members while loads are applied so that the tension from the blade will be distributed.

FIGS. 37–42 show the details of the tension-torsion suspension for the blades 2. Referring to FIG. 37, hub assembly 22 carries lugs 56 which carry horizontal pin 61. The pin 61 has needle bearings 287 which support inboard fitting 285. The fitting 285 has an extending externally tapered portion 57' which carries two external needle bearings 290 and 291. The internal diameter of rotor blade tubular member 288 rides on needle bearings 290 and 291. Blade shell 289 is fixed to tubular member 288.

Miter gear 58 is fixed to tubular member 288 and it meshes miter gear 59 which is rotated for pitch change by blade pitch arm 60.

FIG. 38 shows a fitting 297 which is firmly attached inside of blade shell 289. Fitting 297 comprises a tubular member 293 having an internally flared end on its outboard end and upper and lower plates 294 aft and upper and lower forward plates 317. FIGS. 39 and 40 show partial elevation views of FIGS. 37 and 38 with emphasis on the filament winding.

Plates 294 and 317 carry the centrifugal loads in fitting 297 into the blade shell 289. They are a part of tubular member 293 and flanged member 295 throughout their lengths.

Tubular members 57' and 293 are tapered from a thin wall where filaments 292 enter to their other end where the filaments 292 wrap around horizontal pin 61 at the inboard end of the blade 2 and where filaments 292 wrap around pin 296 at the outboard end of outboard fitting 297.

Fitting 285 has a slot 286 to provide space for filaments 292 where they wrap around horizontal pin 61. The bore in the tubular member 57' and the slot 286 in fitting 285 are connected so as to give a smooth transition between the fibers in tubular member 57' and their wrapping around pin 61. A similar arrangement is provided at the outboard end of outboard fitting 297. Here the inside edges of tubular member 293 are bellmouthed to give smooth transition for the filaments or fibers 292 when they leave tube 293 and wrap around the bar 296. The ends of bar 296 rests against the end of outboard fitting 295 at 318 (see FIG. 38).

The assembly procedure is to wind the wire of filaments 292 around pin 61 and through fittings 57' and 285 at one end and around a dummy pin at the other end representing pin 296; then tie the strands of the filaments 292 to hold them in place when the dummy pin is removed. The tied strands of the filaments 292 are then pulled through spar tube 288 and fitting 297 where pin 296 is placed through the tied area of filaments 292 to hold the outboard end. The assembly is tightened and shimmed between pin 296 and member 295 at 318 (see FIG. 38). Adhesive is applied to keep the shims and filaments 292 in place.

One problem with the convertiblade is to provide the large angles of incidence changes for the rotor blades during transition yet prevent the controls from being too sensitive. This difficulty has been met by introducing miter gears 58 and 59 into the control system. The miter gears 58 and 59 permit the large change in coning angle that occurs between airplane and autogiro configurations to make large changes in blade pitch angle. This is accomplished when blade root 57 moves up about pin 61. Gear 58 is in mesh with stationary control gear 59. The blade 2 rotates in a direction to reduce its pitch angle. The coning angle change between horizontal position as autogiro and trailing position as airplane is 75°. The total collective blade angle change during the transition between positions G and I of FIG. 5 is 50° to 60°. Thus, by selecting the proper gear ratio between the blade 2 and horizontal pin pitch lever position, the final blade folding can be made to be automatic.

Referring to FIGS. 40 and 42, it may be noted that the blade chord at tip 298 is much smaller than the blade root chord at 299. The subject rotor blade has a jet engine 300 at blade tip 298 and a jet nozzle 301. Fuel line 302 connects to the flexible fuel line member 93' of FIG. 14 at the root of the blade 2. These and the other parts of the fuel line feed fuel from hub mounted tank 88 to blade tip engine 300 where the fuel is catalyzed and expanded to provide power for revving-up the rotor and for sustained power to attain sufficient forward flight speed for good autogiro climbing speed.

FIG. 42 is an elevation view of blade shell 289 which also indicates the location of the tension-torsion rod assembly. The blade thickness ratio is approximately 15% of the chord dimension; however, if it is found that greater stiffness of the blades is desired when they are acting as control surfaces for the airplane the blade root thickness ratio can be increased without appreciably increasing the profile drag of the tail surfaces (rotor blades) of the airplane. This is so because the blade chord is greatly increased for a given streamline when they are back. The actual increase in chord is 1/sine $\alpha$ where the angle of the blade axis to fore and aft (streamline) is $\alpha$. The trailing blades are illustrated at 15°. sine 15° = 0.259. 1/0.259 = 3.86. With a blade having a thickness of 0.15 × chord, the effective thickness ratio of the blade will be 0.15 × 0.259 = 3.9%. This gives blade thickness ratio a very low profile drag, and it could be increased without appreciably increasing the profile drag.

When erecting the pylon 1 from airplane to autogiro configuration, the optimum collective blade pitch change is slightly different than when lowering the pylon 1 from autogiro to airplane configuration. In both cases, the total thrust of the pylon 1 may be substantially zero. But in each case the rotational speed of the rotor will be retarding. For these reasons, the cam 323 in twist bearing members 153, FIG. 43 and 44, will be a compromise to best suit both directions of pylon movement. The combined action of the pilot, the springs 225, and weight 226 on collective pitch lever 222 will make the proper corrections to the collective pitch angles of the blades 2 during transitions in both directions.

Collective pitch change of the blades 2, during the first 45° motion of the pylon 1 is greater than during the last 45°. The pylon movement accelerates until it is at or past its mid point; then it decelerates until it stops and is latched at fixture 21. When latched the blades 2 will be reduced beyond their no lift angles where some of the remaining kinetic energy in the rotor can be used to increase the forward speed of the ship. From this point on, the blades 2 will come back rapidly and this movement will cause greater blade pitch reduction due to the action of miter gears 58 and 59. The blades will rest against coning stops 65 (see FIG. 6). The blade pitch is then adjusted to −90° and their rotation is locked by the lever or levers 97 in the slot or slots 95. If the pilot holds lateral stick 184 in neutral, the transfer unit 169 will automatically adjust the blade angles to −90° pitch.

The ratio of blade lift to its weight is approximately 30. An initial deceleration force can therefore be generated of 30 × 32.2 = 966 ft/sec. The force that stops the blade from turning will probably vary from an initial deceleration of 500 feet per second down to that associated with the blade lift coefficient and the forward speed at the instant of stopping. This indicates an average deceleration of around 325 l/sec. The center of procussion of the blades are initially moving at a speed of 325 l/sec. The time to stop the rotor will be 1 second.

The velocity of air flow over the advancing side of autogiro rotor is greater than it is on the side where the blades are retreating. This causes the blades to flap up on the advancing side and down on the retreating side.

Cyclic blade pitch changes cause the blades to flap high on one side of the rotor and low on the other side of the rotor. This creates control forces on the hub assembly 22 that control the attitude of the convertiblade in normal flight and also it moves the rotor and pylon 1 from one flight configuration to another. The control occurs because the rotor lift is (a) slanted relative to the $\mathcal{C}$ of rotation, and (b) when the horizontal hinges are offset from the $\mathcal{C}$ of rotation an additional moment is created. A component of the centrifugal forces in the blades 2 acts parallel to the pylon 1 at horizontal hinges 61 when the blades 2 are coned above or below the horizontal. For example, if the rotor of FIG. 6 were turning, the blade indicated at blade root fitting 57 would cause a down load at pin 61. When the blades are flapping about horizontal hinges 61, created by changes in the speed of air flow over the advancing and retreating blades 2 or when they are flapping from cyclic pitch control, unsymmetrical forces are introduced into hub assembly 22. (The other blades create different forces according to their coning angle.) Horizontal hinge 61 is offset away from the $\mathcal{C}$ of hub assembly 22 and therefore force 319 creates a moment on hub assembly 22 and its pylon 1 which causes pylon 1 to move abouts its pivot 19. Without thrust, the control noted as (a) above, is not effective, therefore, type (b) control will be used to move pylon 1 between its two configurations.

After the pylon 1 is released at 20, the blades are flapping up in a forward quadrant. This creates a force tending to move pylon 1 aft about its hinge 19. As the pylon 1 and blades 2 approach the airplane position, the forward flight flapping is eliminated. This tends to retard the movement of the pylon 1 at the end of its movement in either direction. When the blades 2 are trailing, there is no natural flapping. The greatest natural flapping occurs in autogiro configuration at high speed.

Pylon pivot 19 is above the center of gravity of the convertiblade. When the rotor has a positive or negative thrust, the force is carried to hinge 19. Such a force creates a moment about the fixed center of gravity of the convertiblade (less pylon 1 and blades 2). This force can cause pitching moments that are stabilizing or destabilizing when the center of gravity lies away from the $\mathcal{C}$ of the thrust force. The constructive use of these moments is discussed later.

Transition while stopping the trailing blades is different than transition while starting the trailing blades. In the latter case at the beginning, the pitch angle of the blades is gradually increased to give a desired drag force on the airplane configuration to slow it. The thrust of a rotor varies as its rotational speed squared and directly with the angles of attack of the blades. The centrifugal force on the blades also varies as the rotor speed squared. This indicates that the coning angle remains nearly constant for a given angle of attack of the blades. At a given blade pitch angle, the forward speed and rotational speed is established by the relationship given above for a windmilling rotor. As the convertiblade is retarded, the pitch angles of the blades are increased to maintain a constant rate of deceleration. To maintain the longitudinal stability of the convertiblade, one or more of the following will be accomplished: (a) The blades will be feathered so as to cause the drag of the rotor to pass through or closer to the center of gravity of the convertiblade. (b) Elevators at the tips of the wings will be depressed to create a nose down moment. (c) A deflector will move down into the engine exhaust to produce a nose down moment. (d) The pylon will be located lower in the fuselage to reduce the offset between the pylon and the fixed center of gravity.

When the convertiblade has slowed to the high speed of the autogiro with the rotor at normal operating speed, the pylon latch at 21 (see FIG. 1) is released and the conversion is initiated by tilting the rotor forward at the top and aft at the bottom. It may be necessary to momentarily tilt the rotor back while the pylon 1 is being unlatched from the fuselage at 21. The tilting back of the rotor tends to raise the nose of the convertiblade.

Increasing the angles of attack of wing tips 5 creates nose down moments and decreasing angles of attack of wing tips 5 creates nose up moments. Thus, the wing tips acting as elevators can control the attitude of the convertiblade during transition. Likewise, deflecting the engine exhaust or utilizing rotor thrust can also be used to control the attitude of the convertiblade during transition. During transition, controls (b) or (c) above are available for controlling the attitude of the fuselage. Also, the collective pitch provides an additional control. If the pylon lies above and forward of the fixed center of gravity of the fuselage et al, positive blade pitch creates a nose up moment and conversely control movement toward negative blade pitch causes a reverse in the pitching moment.

As the rotor approaches the autogiro position, the blade pitch angles are increased until they are at a positive angle of 3° to 5° to the rotor disc. The cam 323 (see FIG. 44) in twist bearings or pivots 153 automatically provide for a majority of the collective blade pitch angles during transition.

The wing tips 5 may be operated differentially as wing tip ailerons during transition. This may be needed between the time that the rotor is unlatched from the pylon 1 and fuselage 3 by removing lever 97 from the slot or notch 95 to the time that the pylon is in a partial upright position where lateral autogiro control will be effective. One approach would have lateral autogiro control for slow speed flight with wing tip aileron control effective at transition speed. Another would have the ailerons activated at greater than normal lateral control stick movement. In the latter case, limit switchs would be arranged between the torque tube 185 and fuselage 3 such as indicated at 367 in FIG. 26 where a projecting arm 366 activates one of the two switches 367 with each activating its associated aileron. A similar switching arrangement can be arranged at the pivot between control stick 184 and torque tube 185. In this manner, the ailerons and elevators may be activated through the control stick 184 when the stick 184 is moved near to its limits.

The collective blade pitch requirements for a convertiblade are tremendous relative to that of a helicopter.

Two large changes in collective blade pitch are taken care of automatically as taught in this application. One by the coning movement of the rotor blade and the other by the movement of the pylon relative to the fuselage. These automatic means of collective blade pitch are important. With them the movement of the collective pitch lever in the cockpit will have about the same sensitivity as that of helicopters but without the automatic pitch changes stated above the collective pitch lever would be too sensitive.

I claim:

1. In an aircraft including an airframe, pitch controlled blades, support means for rotatably supporting said blades, pivot means to pivotally connect said support means to said airframe for free pivotal movement between a substantially vertical position and a substantially horizontal position, said airframe having first locking means to lock said support means in its vertical position, second locking means to lock said support means in its horizontal position, and pitch change means to change the pitch of said blades to enable the aerodynamic forces acting on said blades to provide the force to move said support means to its horizontal position from its vertical position when said first locking means is released and to change the pitch of said blades to enable the aerodynamic forces acting on said blades to provide the force to move said support means to its vertical position from its horizontal position when said second locking means is released.

2. The aircraft according to claim 1 including
a first double acting hydraulic piston and cylinder actuated by movement of said support means about said pivot means; a second actuator hydraulic piston and cylinder; movement of said second piston connected to said pitch change means; hydraulic connections between said first and second cylinders; and the movement of said first piston urges said second piston to move said pitch change means.

3. The aircraft according to claim 2 in which said second hydraulic cylinder contains a metering pin; and said second piston has a mating aperture.

4. The aircraft according to claim 2 in which said second piston has relief valves to limit the pressure moving said second piston.

5. The aircraft according to claim 1 including means to prevent rotation of said blades when said support means is in its horizontal position while permitting said pitch change means to change the pitch of said blades to aid in controlling the motion of the aircraft.

6. The aircraft according to claim 5 in which said airframe includes a fuselage and a wing and said pivot means pivotally connects said support means to said fuselage.

7. The aircraft according to claim 6 in which said pitch change means includes collective pitch change means and cyclic pitch change means.

8. The aircraft according to claim 7 in which said cyclic pitch change means includes first cyclic pitch change means to change the cyclic pitch of said blades about a first axis of the aircraft and second cyclic pitch change means to change the cyclic pitch of said blades about a second axis of the aircraft and the first and second axes being substantially orthogonal to each other, first, second, and third pilot control means for changing the pitch of said blades, said collective pitch change means includes transfer means to cause one of said first and second pilot control means to move said blades to change their collective pitch when said support means is in its horizontal position and the other of said first and second pilot control means to move said blades to change their collective pitch when said support means is in a position other than its horizontal position, said second cyclic pitch change means includes transfer means to cause said third pilot control means to move said blades to change the cyclic pitch of said blades about one of the first and second axes when said support means is in its horizontal position and to cause said first pilot control means to move said blades to change the cyclic pitch of said blades about the one of the first and second axes when said support means is in a position other than its horizontal position, and said first cyclic pitch change means includes transfer means to cause said first pilot control means to move said blades to change the cyclic pitch of said blades about the other of the first and second axes when said support means is in its horizontal position and to cause said first pilot control means to move said blades in conjunction with said second cyclic pitch change means to change the cyclic pitch of said blades about the other of the first and second axes when said support means is in a position other than its horizontal position.

9. The aircraft according to claim 7 including first control means to cause said collective pitch change means to change the collective pitch in response to movement of a first pilot control when said support means is in its horizontal position and to movement of a second pilot control when said support means is in a position other than its horizontal position and second control means to cause said cyclic pitch change means to change the cyclic pitch in response to movement of a third pilot control when said support means is in its horizontal position and to movement of the first pilot control when said support means is in a position other than its horizontal position.

10. The aircraft according to claim 7 in which said collective pitch change means includes cam means responsive to movement of said support means from one of its horizontal and vertical positions to the other to automatically change the collective pitch of said blades.

11. The aircraft according to claim 1 in which said airframe includes a fuselage and a wing and said pivot means pivotally connects said support means to said fuselage.

12. The aircraft according to claim 11 in which said pitch change means includes collective pitch change means and cyclic pitch change means.

13. The aircraft according to claim 12 in which said cyclic pitch change means includes first cyclic pitch change means to change the cyclic pitch of said blades about a first axis of the aircraft and second cyclic pitch change means to change the cyclic pitch of said blades about a second axis of the aircraft and the first and second axes being substantially orthogonal to each other, first, second, and third pilot control means for changing the pitch of said blades, said collective pitch change means includes transfer means to cause one of said first and second pilot control means to move said blades to change their collective pitch when said support means is in its horizontal position and the other of said first and second pilot control means to move said blades to change their collective pitch when said support means is in a position other than its horizontal position, said second cyclic pitch change means includes transfer means to cause said third pilot control means to move said blades to change the cyclic pitch of said blades about one of the first and second axes when said support means is in its horizontal position and to cause said first pilot control means to move said blades to change the cyclic pitch of said blades about the one of the first and second axes when said support means is in a position other than its horizontal position, and said first cyclic pitch change means includes transfer means to cause said first pilot control means to move said blades to change the cyclic pitch of said blades about the other of the first and second axes when said support means is in its horizontal position and to cause said first pilot control means to move said blades in conjunction with said second cyclic pitch change means to change the cyclic pitch of said blades about the other of the first and second axes when said support means is in a position other than its horizontal position.

14. The aircraft according to claim 12 including first control means to cause said collective pitch change means to change the collective pitch in response to movement of a first pilot control when said support means is in its horizontal position and to movement of a second pilot control when said support means is in a position other than its horizontal position and second control means to cause said cyclic pitch change means to change the cyclic pitch in response to movement of a third pilot control when said support means is in its horizontal position and to movement of the first pilot control when said support means is in a position other than its horizontal position.

15. The aircraft according to claim 1 including control means to cause said pitch change means to change the pitch of said blades in response to a first pilot control when said support means is in its horizontal position and to a second pilot control when said support means is in a position other than its horizontal position.

16. The aircraft according to claim 15 in which said control means includes first means connected to said blades, second means connected to the first pilot control, third means connected to the second pilot control, and means movable in response to the position of said support means to selectively connect said first connected means to one of said second connected means and said third connected means.

17. The aircraft according to claim 16 in which said first connected means has means cooperating with each of said second connected means and said third connected means to maintain said said first connected means aligned with one of said second connected means and said third connected means when said first connected means is connected to the other of said second connected means and said third connected means.

18. The aircraft according to claim 16 in which said first connected means, said second connected means, and said third connected means are mounted for rotation about a single axis, said second and third connected means being disposed on opposite sides of said first connected means, said first connected means has first cooperating means and second cooperating means on opposite sides thereof, said second connected means has cooperating means to cooperate with said first cooperating means to connect said second connected means to said first connected means for rotation when said first connected means rotates, said third connected means has cooperating means to cooperate with said second cooperating means to connect said third connected means to said first connected means for rotation when said first connected means rotates, said first connected means being movable by said movable means along the axis of rotation to have said first connected means connected to only one of said second connected means and said third connected means at any time, and said first cooperating means and said second cooperating means being shaped to cause said first cooperating means and said second cooperating means to remain aligned with said cooperating means of said second connected means and said third connected means that is not connected to said first connected means.

19. The aircraft according to claim 1 including means connected to said support means and responsive to movement of said support means about said pivot means from one of its horizontal and vertical positions to the other to cause said pitch change means to change the pitch of said blades to retard the movement of said support means as said support means approaches the one of its horizontal and vertical positions to which it is being moved.

20. The aircraft according to claim 1 in which said pitch change means to change the pitch of said blades is oriented in one of first and second selected directions relative to the direction of flight of said aircraft at any time, and shifting means shifts the orientation between the first and second directions.

21. In an aircraft, an airframe, pitch controlled blades, support means to rotatably support said blades on said airframe, means to move said blades from an autogiro configuration to an airplane configuration and vice versa, means to change the pitch of said blades, and means responsive to said blades being moved from the airplane configuration to shift said pitch change means from one of the pilot's controls to another.

22. In an aircraft including an airframe; a rotor including pitch controlled blades; support means to rotatably support said rotor; cyclic pitch control means to control the cyclic pitch of said blades by acting on said rotor at a selected phase angle position; said cyclic pitch control means including first means rotating with said rotor, second means normally rotational stationary and having said first means rotate relative thereto, and third means causing said second means to act on said first means to change the cyclic pitch of said blades; and position changing means to rotate said second means relative to said third means to alter the position of said second means relative to said first means to change the location of the selected phase angle position at which said second means of said cyclic pitch control means acts on said first means of said cyclic pitch control means.

* * * * *

UNITED STATES PATENT OFFICE
CERTIFICATE OF CORRECTION

Patent No. 4,059,247                    Dated November 22, 1977

Inventor(s) Richard H. Prewitt

It is certified that error appears in the above-identified patent and that said Letters Patent are hereby corrected as shown below:

Column 3, line 21, "of" should read -- at --.

Column 4, line 29, "driving" should read -- diving --.

Column 6, line 14, "13" should read a -- dash - --.

UNITED STATES PATENT OFFICE
CERTIFICATE OF CORRECTION

Patent No. 4,059,247          Dated November 22, 1977

Inventor(s) Richard H. Prewitt

It is certified that error appears in the above-identified patent and that said Letters Patent are hereby corrected as shown below:

Column 7, line 1, "as" should read -- are --.

Column 7, line 67, after "stick" insert -- 184 --.

Column 9, line 65, "80" should read -- 89 --.

Column 9, line 66, "80" should read -- 89 --.

Column 10, line 2, "80" should read -- 89 --.

Column 10, line 7, "relatively" should read -- relative --.

Column 10, line 13, after "57" insert -- in FIG. 6 --.

Column 10, line 36, after "98" insert a -- comma (,) --.

Column 10, line 46, after "blades" insert -- 2 --.

Column 10, line 47, after "either" and before the "comma (,)" insert -- case --.

Column 11, line 11, "abouts" should read -- about --.

Column 11, line 22, "if" should read -- If --.

Column 11, line 26, "log" should read -- lag --.

Page 3 of 5

UNITED STATES PATENT OFFICE
CERTIFICATE OF CORRECTION

Patent No. 4,059,247　　　　　Dated November 22, 1977

Inventor(s) Richard H. Prewitt

It is certified that error appears in the above-identified patent and that said Letters Patent are hereby corrected as shown below:

Column 11, line 40, "titled" should read -- tilted --.

Column 12, line 44, after "pylon" insert -- tube 51 --.

Column 12, line 62, "it" should read -- It --.

Column 13, line 2, "autogrie" should read -- autogiro --.

Column 14, line 23, "by" should read -- to --.

Column 14, line 37, after "internally" insert -- of --.

Column 15, line 5, "cans" should read -- cams --.

Column 15, line 8, last occurrence of the "comma (,)" should read -- 1 --.

Column 15, line 30, "transistion" should read -- transition --.

Column 15, line 36, after "blades" insert -- 2 --.

Column 15, line 36, "transistion" should read -- transition --.

Column 15, line 49, after "member" insert -- or twist bearing --.

Column 15, line 50, delete "or twist bearing"

UNITED STATES PATENT OFFICE
CERTIFICATE OF CORRECTION

Patent No. 4,059,247  Dated November 22, 1977

Inventor(s) Richard H. Prewitt

It is certified that error appears in the above-identified patent and that said Letters Patent are hereby corrected as shown below:

Column 16, line 1, "70" should read -- 170 --.

Column 16, line 21, "a3" should read -- d3 --.

Column 16, line 62, "comrised" should read -- comprised --.

Column 17, line 32, "conneced" should read -- connected --.

Column 17, line 54, delete "structure"

Column 17, line 60, "adjustable" should read -- adjustably --.

Column 17, line 61, "it's" should read -- its --.

Column 18, line 4, delete "end".

Column 19, line 43, after "by" insert -- the --.

Column 19, line 43, after "cockpit" insert -- control --.

Column 20, line 15, after "All" insert -- three --.

Column 22, line 44, delete "371".

Column 22, line 50, after "switch" insert -- 371 --.

UNITED STATES PATENT OFFICE
CERTIFICATE OF CORRECTION

Patent No. 4,059,247      Dated November 22, 1977

Inventor(s) Richard H. Prewitt

It is certified that error appears in the above-identified patent and that said Letters Patent are hereby corrected as shown below:

Column 25, line 11, after "blades" insert -- 2 --.

Column 25, line 60, after "blades" insert -- 2 --.

Column 26, line 46, after "tips" insert -- 5 --.

Signed and Sealed this

Ninth Day of May 1978

[SEAL]

Attest:

RUTH C. MASON  
Attesting Officer

LUTRELLE F. PARKER  
Acting Commissioner of Patents and Trademarks